United States Patent [19]
Gearin et al.

[11] Patent Number: 5,445,278
[45] Date of Patent: Aug. 29, 1995

[54] ADJUSTABLE VEHICLE-CARRYING FRAME FOR INSERTION INTO DIFFERENTLY-SIZED CONTAINERS

[75] Inventors: Peter Gearin, Portland; Terence Halpin, Oregon City; James D. Pileggi, Beaverton, all of Oreg.; Michael P. J. Browne, Vancouver, Wash.; William C. Beutler, Portland, Oreg.

[73] Assignee: G & G Intellectual Properties, Inc., Portland, Oreg.

[21] Appl. No.: 173,677

[22] Filed: Dec. 22, 1993

Related U.S. Application Data

[63] Continuation-in-part of Ser. No. 143,873, Oct. 27, 1993, abandoned, which is a continuation-in-part of Ser. No. 871,288, Apr. 20, 1992, which is a continuation-in-part of Ser. No. 720,893, Jun. 25, 1991, Pat. No. 5,105,951, which is a continuation of Ser. No. 500,476, Mar. 28, 1990, Pat. No. 5,040,938, which is a continuation of Ser. No. 261,504, Oct. 24, 1988, Pat. No. 4,963,067, which is a continuation-in-part of Ser. No. 943,688, Dec. 18, 1986, Pat. No. 4,797,049.

[51] Int. Cl.$^6$ ............................................. B60P 1/64
[52] U.S. Cl. ........................................... 211/13; 410/9; 410/16; 410/18; 414/400; 414/786
[58] Field of Search ............................ 211/13, 175, 191; 410/14, 25, 26, 13, 29.1, 30, 9, 18, 3, 16; 414/400, 398, 143.2, 234, 498, 549, 542, 679, 343, 395, 786

[56] References Cited

U.S. PATENT DOCUMENTS

| | | | |
|---|---|---|---|
| 1,724,556 | 8/1929 | Blakely | 410/9 X |
| 3,667,635 | 6/1972 | Hackney . | |
| 3,938,678 | 2/1976 | Kern . | |
| 4,124,119 | 11/1978 | Nordstrom | 206/335 |
| 4,759,668 | 7/1988 | Larson et al. . | |
| 4,768,916 | 9/1988 | Gearin et al. | 410/9 X |
| 4,797,049 | 1/1989 | Gearin et al. | 414/400 |
| 4,919,582 | 4/1990 | Bates et al. | 410/9 X |
| 4,963,067 | 10/1990 | Gearin et al. | 414/400 |
| 5,040,935 | 8/1991 | Gearin et al. | 414/400 |
| 5,105,951 | 4/1992 | Gearin et al. | 414/400 X |
| 5,106,246 | 4/1992 | Chance . | |

FOREIGN PATENT DOCUMENTS

| | | |
|---|---|---|
| 468349A1 | 1/1992 | European Pat. Off. . |
| WO90/11911 | 10/1990 | WIPO . |

OTHER PUBLICATIONS

Ace Controls, Inc., Catalog No. 48-10-91 (Published 1988).

*Primary Examiner*—Robert W. Gibson, Jr.
*Attorney, Agent, or Firm*—Chernoff, Vilhauer, McClung & Stenzel

[57] ABSTRACT

An adjustable frame for carrying vehicles between elongate upright sides preferably includes a length-adjusting mechanism for expanding the length of the frame to fit transport containers of different sizes, a friction-reducing mechanism for smoother, safer and faster lengthwise adjustment of the respective frame sections, and a door-protecting mechanism including not only the length-adjusting mechanism but also shock-absorbing bumper assemblies for protecting the container door, the frame and the vehicles on the frame through a reduction in the peak level of shock forces generated during collisions between the container door and the frame. Preferably, the adjustable frame has only two sections for faster locking and is configured to flexibly accommodate different vehicle lengths, including by support of a pair of vehicle wheels in a center position on the frame.

23 Claims, 16 Drawing Sheets

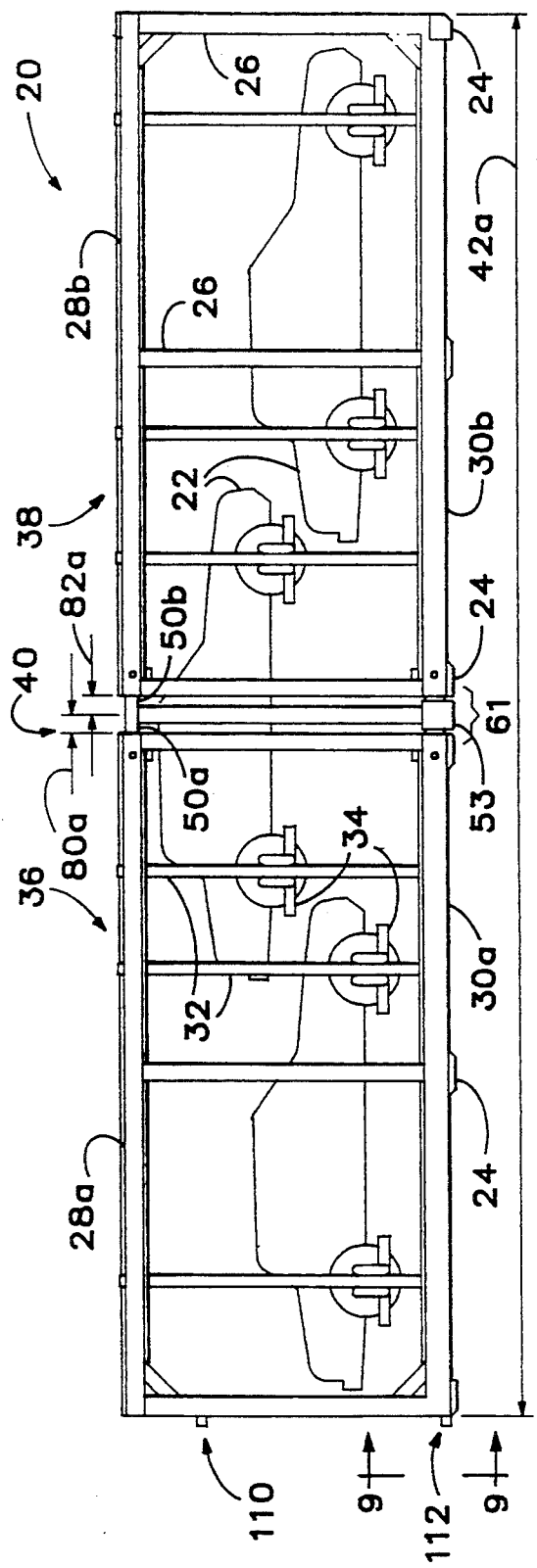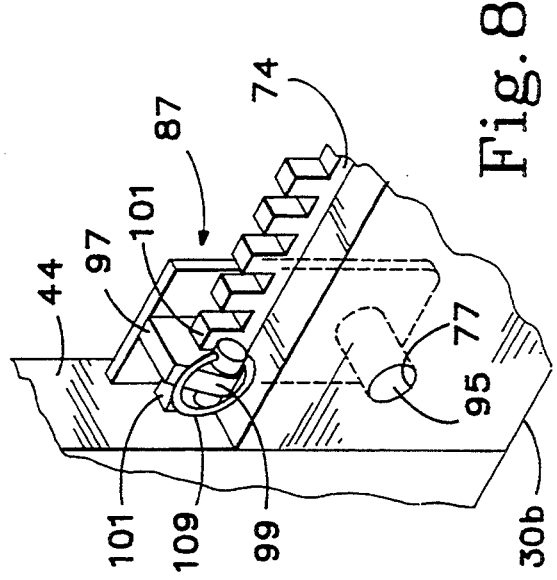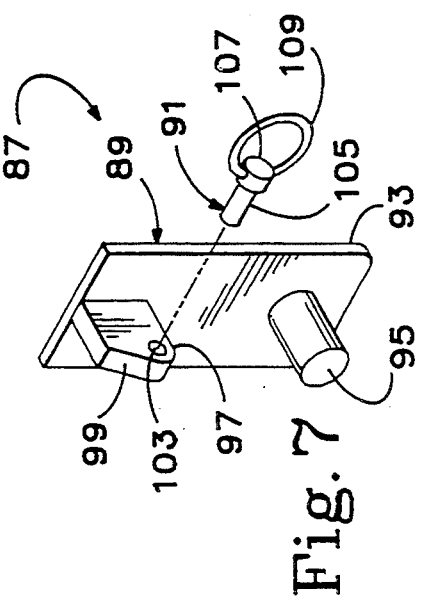

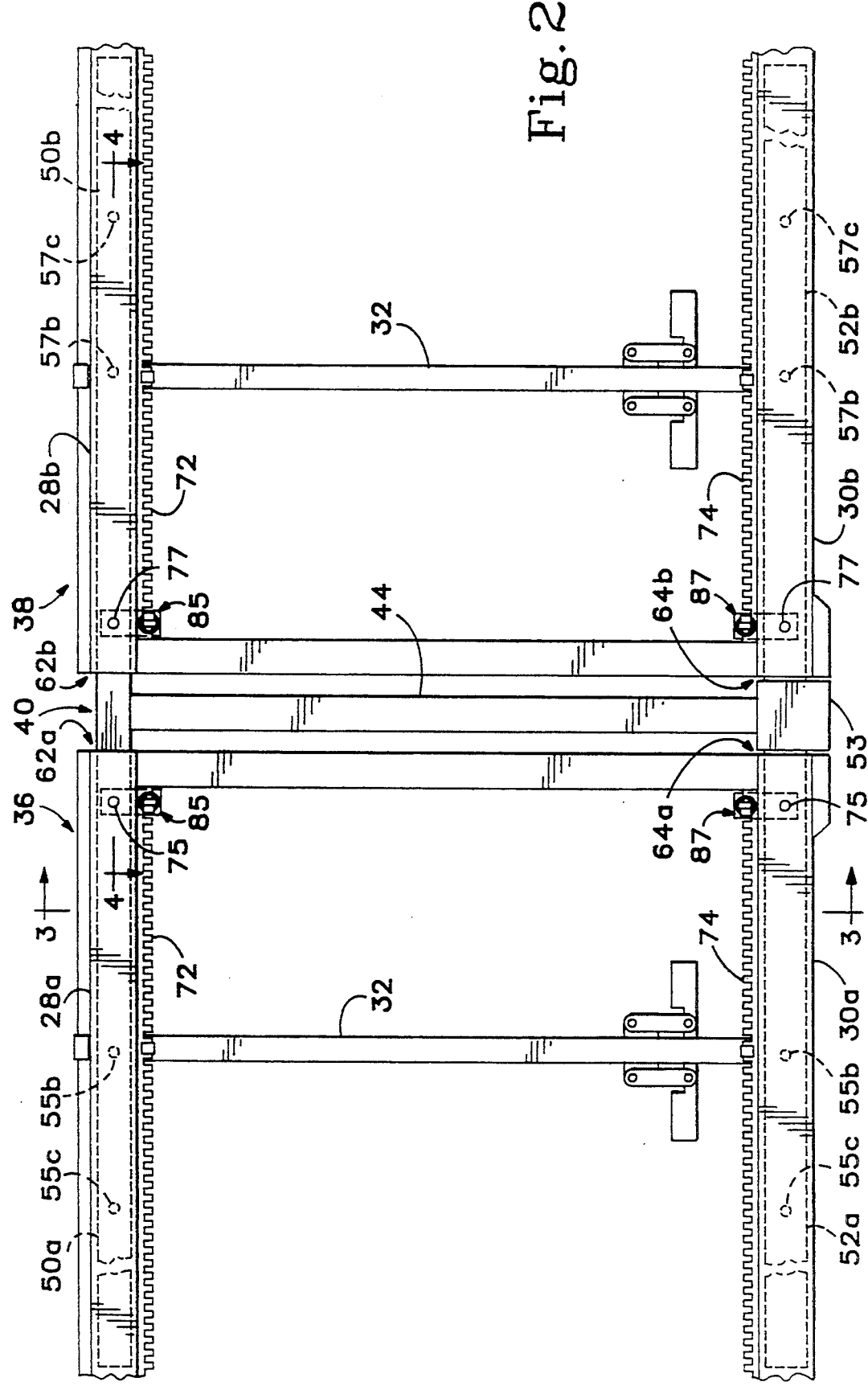

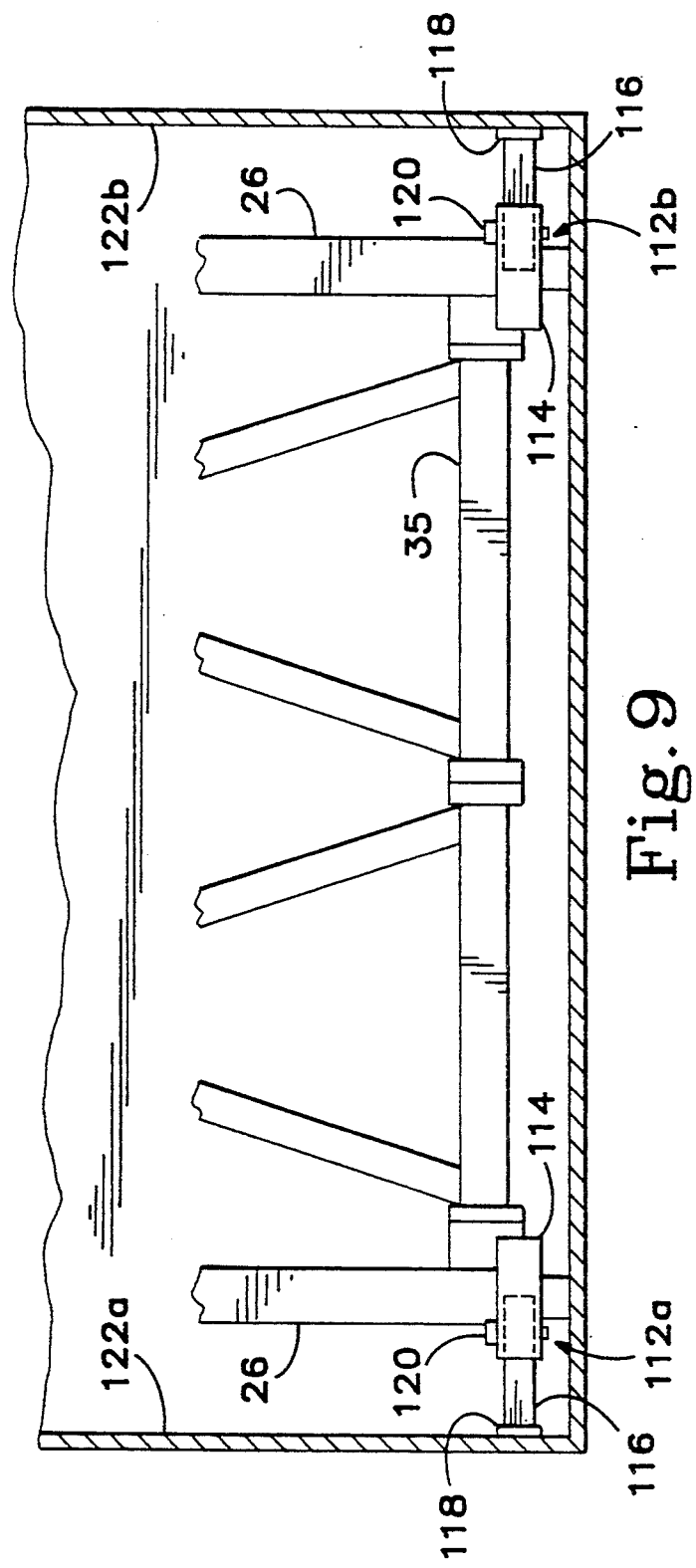

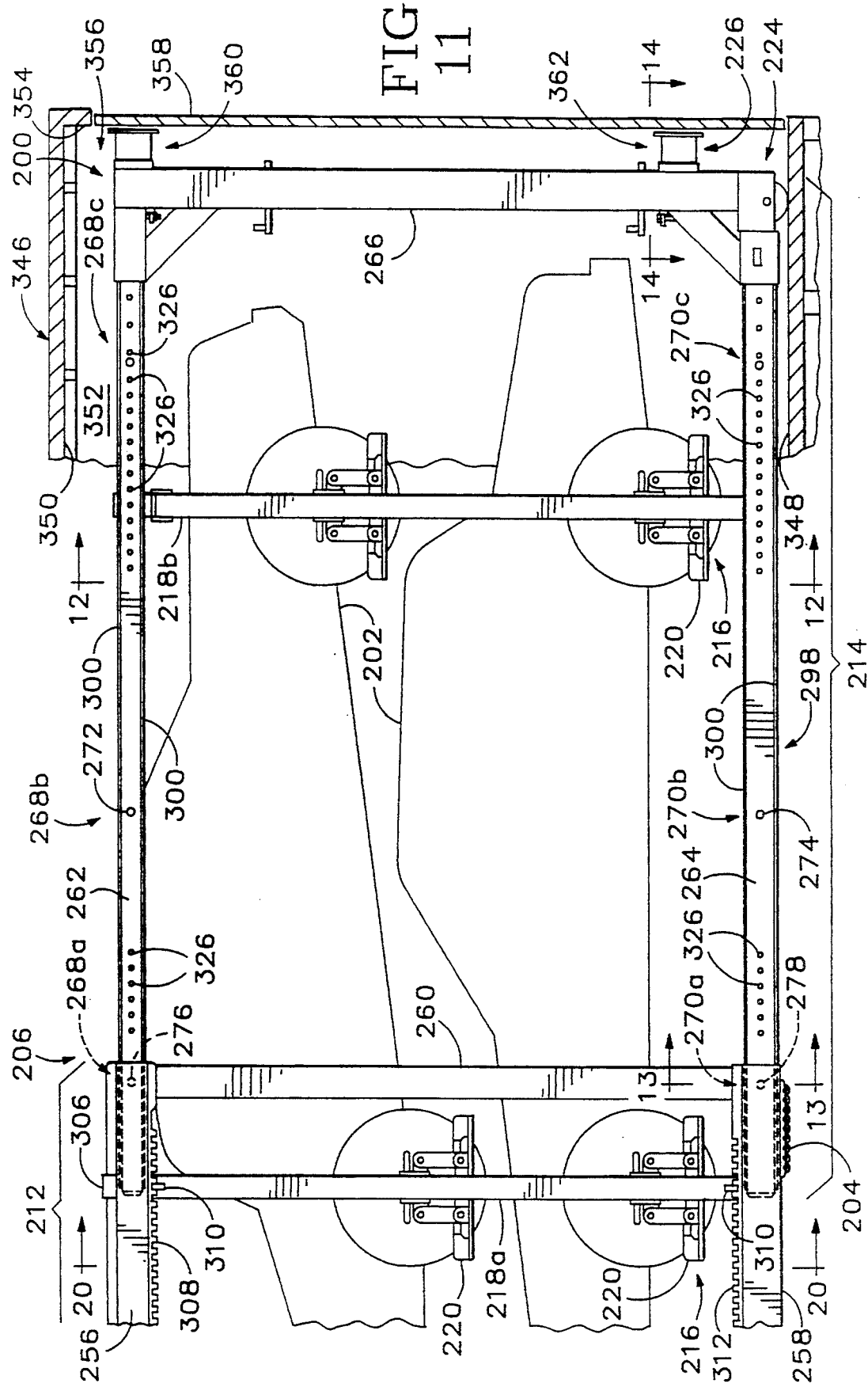

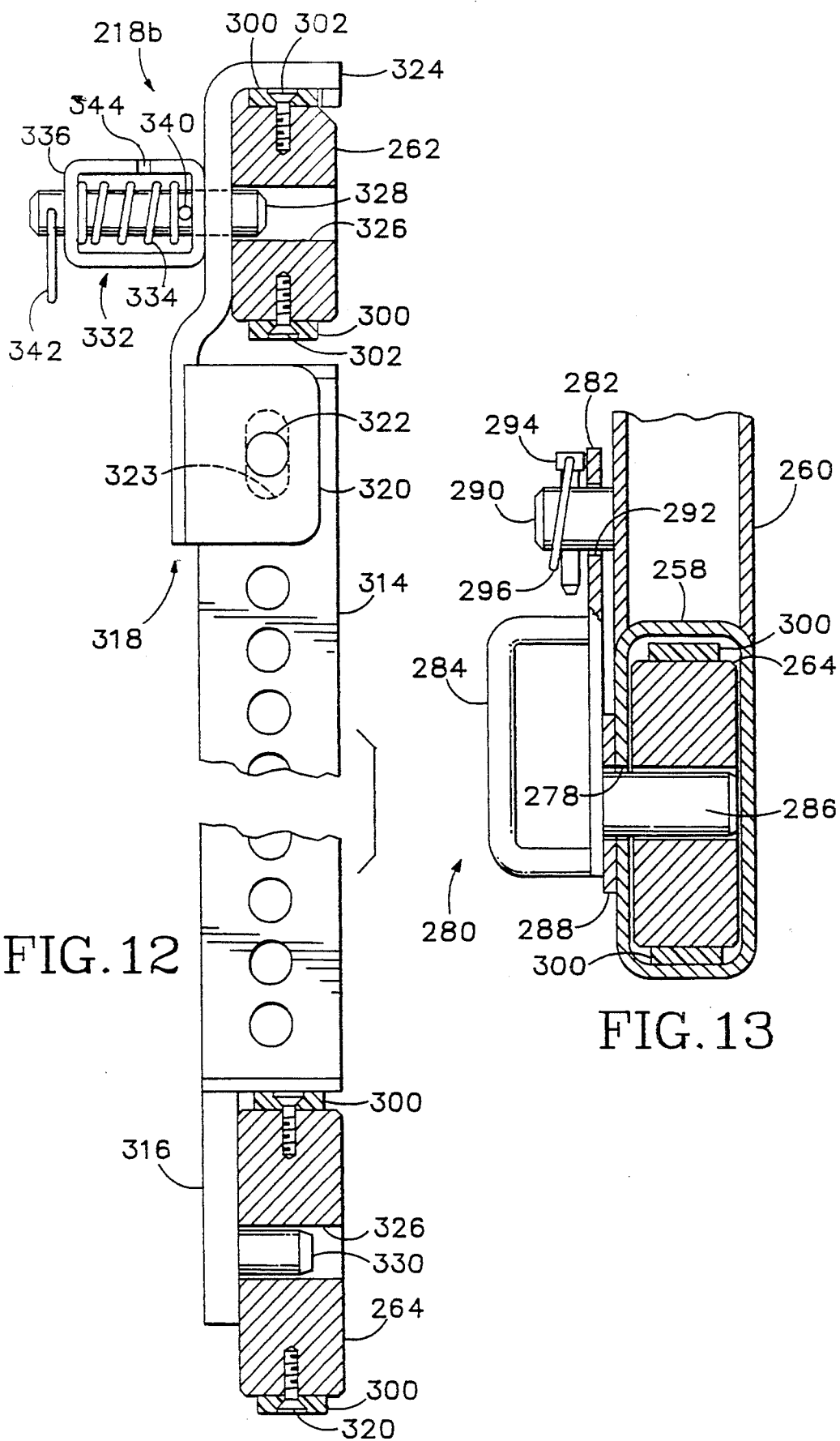

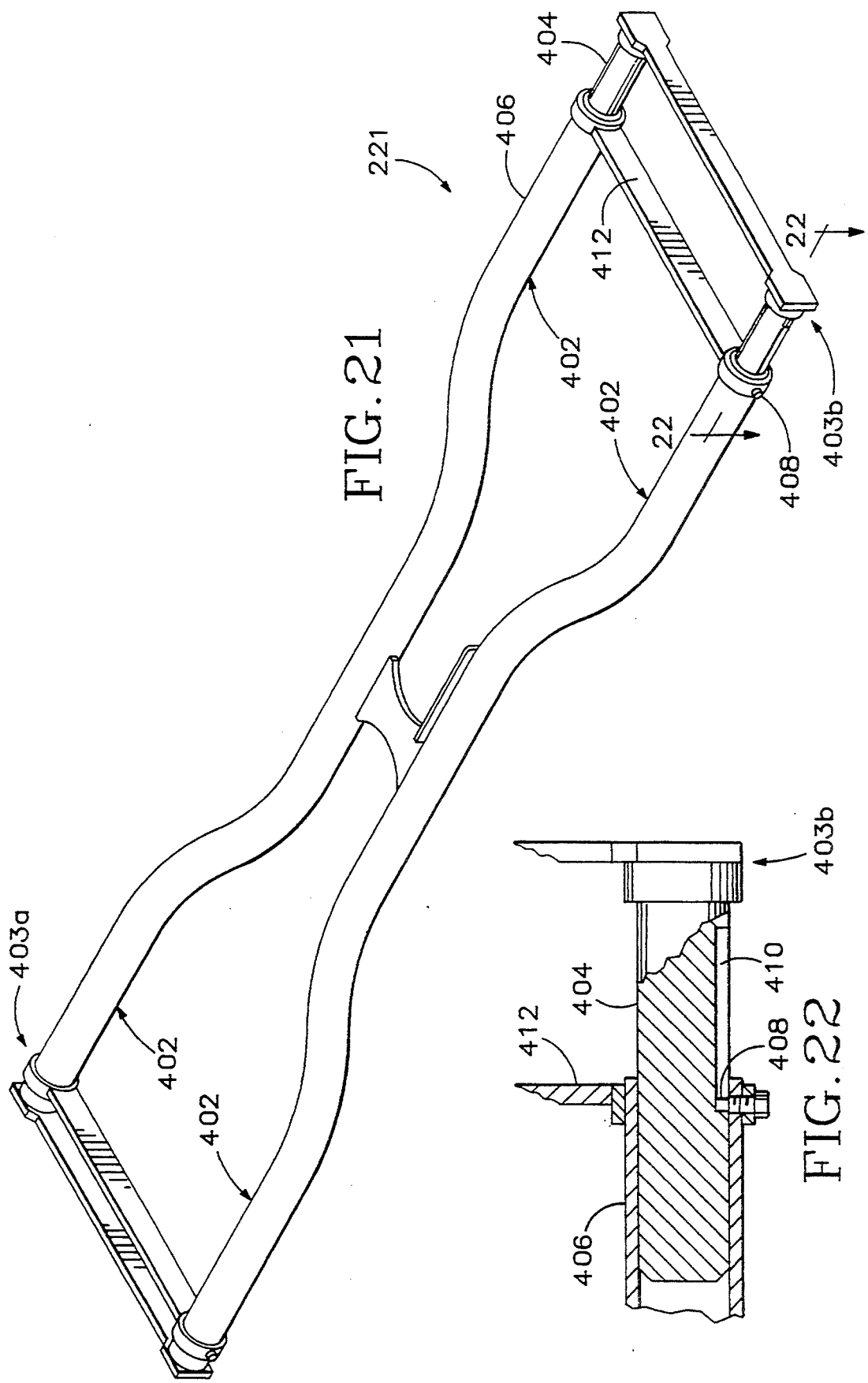

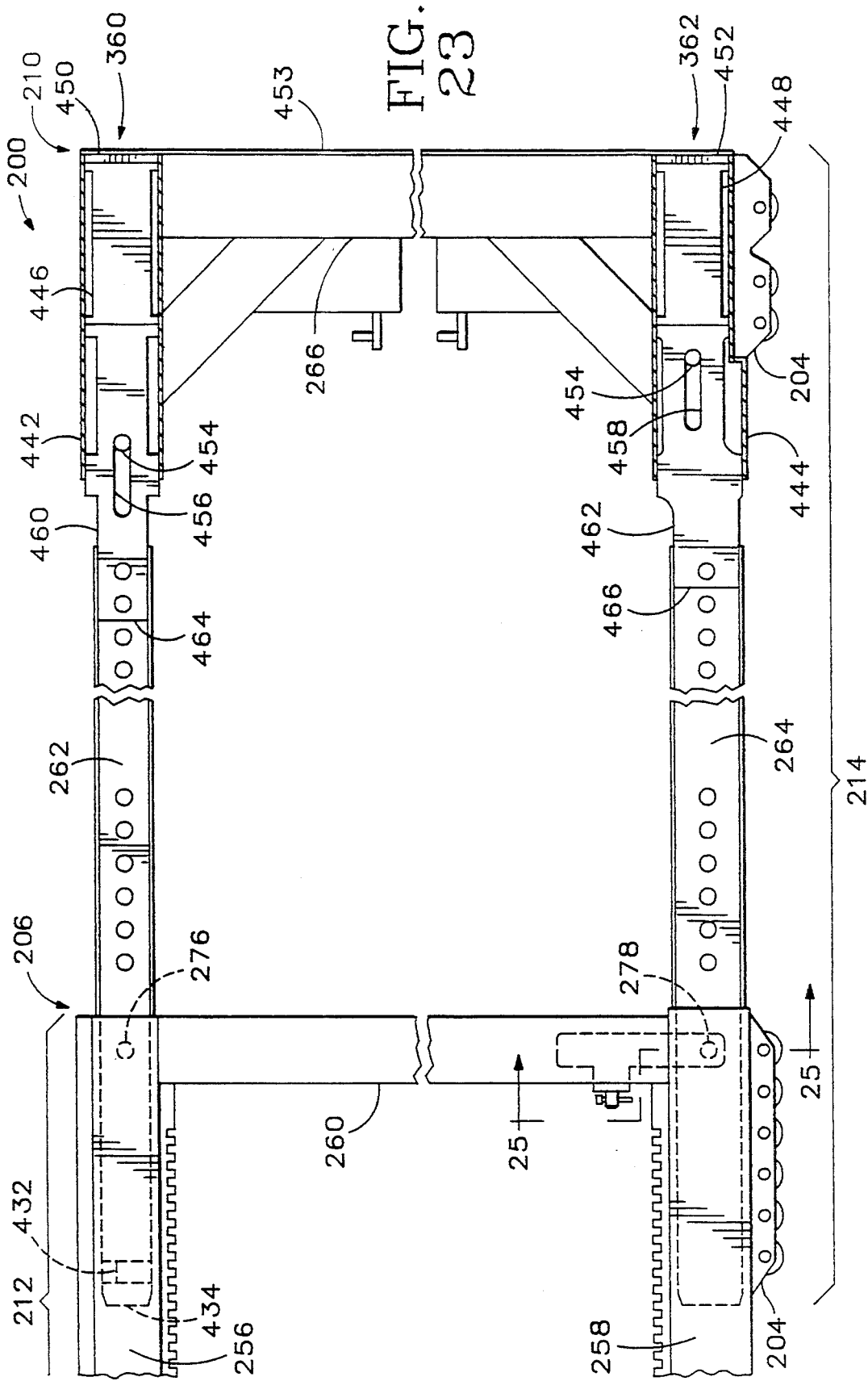

ADJUSTABLE VEHICLE-CARRYING FRAME FOR INSERTION INTO DIFFERENTLY-SIZED CONTAINERS

This application is a continuation-in-part of U.S. patent application Ser. No. 143,873 filed Oct. 27, 1993, now abandoned, which in turn is a continuation-in-part of U.S. patent application Ser. No. 871,288, filed Apr. 20, 1992, which in turn is a continuation-in-part of U.S. patent application Ser. No. 720,893, filed Jun. 25, 1991, now U.S. Pat. No. 5,105,951, which in turn is a continuation of U.S. patent application Ser. No. 500,476, filed Mar. 28, 1990, now U.S. Pat. No. 5,040,938, which in turn is a continuation of U.S. patent application Ser. No. 261,504 filed Oct. 24, 1988, now U.S. Pat. No. 4,963,067, which in turn is a continuation-in-part of U.S. patent application Ser. No. 943,688, filed Dec. 18, 1986, now U.S. Pat. No. 4,797,049.

BACKGROUND OF THE INVENTION

The present invention relates to frames of the type having a generally open-sided construction making possible the loading of two or more tiers of vehicles onto the frame and which, after being loaded, are adapted for insertion into a standard cargo-carrying container for shipment. In particular the present invention relates to improvements in this basic type of frame that enable better utilization of lengthwise container space.

Frames of the above-referenced basic type are shown, for example, in Gearin, et al. U.S. Pat. Nos. 4,768,916 and 4,797,049. In each of these references, the frame shown is of a generally open-sided box-like construction where each side of the frame includes a longitudinally-extending upper and lower rail. At the corners of the frame and at longitudinally-spaced positions therebetween, upright brace members are used to connect together the upper and lower rails. At the ends of the frame, the sides are connected together such as by a spreader bar or by a two-panel centrally-hinged gate that is capable of being folded inwardly in order to collapse the sides of the frame.

In order to support vehicles on the above-described type of frame, respective pairs of elongate wheel cradles are suspended across the respective sides of the frame to support the forward and rearward wheels of each vehicle. In particular, each end of each wheel cradle is supported by an end hanger which, in turn, is vertically slidable and adjustably lockable along a post member suspended by its upper end from the upper rail of the frame. The vertical slidability of the end hangers makes possible power-assisted vertical lifting of each vehicle by the hangers. The upper ends of the respective post members are, in turn, longitudinally movable along the upper rails in order to compensate for differences in vehicle wheel base as well as to allow tilting of the vehicles. An elongate plate having numerous openings or slots spaced therealong is affixed to the inward edge of each upper rail, each opening or slot providing a different pinning or locking position for each post member.

A difficulty with the basic type of frame just described arises because of the differing sizes of containers that are encountered at different vehicle loading and unloading stations. In particular, cargo-carrying containers that are 40 feet, 45 feet, or 48 feet in length may be encountered. The frames of the basic type described, being of fixed dimension, are required to have a length no longer than that which will fit within the shortest container. Accordingly, there is the possibility of collision or shock damage to the containers, the frame or to the vehicles loaded on the frame during to-and-fro movement of these frames within longer-length containers during transport. Moreover, even if a movement-limiting mechanism is provided to limit such to-and-fro movement, there is still the problem of the reduction in the number of vehicles that can be shipped in the longer-length containers over what might otherwise have been shipped in such containers. For example, whereas normally only three larger-sized vehicles can be carried on each frame when each frame is 39 feet in length (suitable for a 40-foot container) if, instead, the frames were to be 47 feet in length (suitable for a 48-foot container) it might be possible to carry as many as six larger-sized vehicles.

In view of the foregoing, there is a need for a vehicle-carrying frame having an improved design that enables fuller use of the available space inside each different size of transport container. Conceivably, for example, auxiliary sections which attach to the ends of the basic frame could be used for selectively extending that frame's length. However, such sections would be unwieldy to handle and could pose a falling hazard to operator and equipment alike since each section would presumably need to be as tall as the frame, of three to five feet in length, and of sufficient structural bulk to support vehicles along its sides. In any improved design, there should be a minimal risk of operator injury, whether such risk is a result of falling hazards or of other type of hazards. It is preferable, for example, to avoid having any mechanism which has pairs of members that close by angular movement to a position alongside each other, for such a mechanism, when used by an inattentive operator, may pose a pinching-type hazard.

In addition to the above safety-related concerns, there are also efficiency concerns relating to the time needed for setup. For example, when setting up the frame for use in a container of a length different than that in previous use, preferably it will not be necessary to disassemble and reassemble major portions of the frame.

In order to flexibly ensure maximum utilization of lengthwise container space, it is desirable that any improvement to the basic frame retain the capacity of that frame for accommodation of varying-length vehicles. It is desirable, in other words, that the lengthwise space of any improved frame be capable of flexible allocation so that a vehicle of very large length, such as a limousine, can be supported endwise of a vehicle of very small length, such as a subcompact. In this manner, full use can be made of the available lengthwise space without any practical limits being imposed on the lengths of the vehicles being carried. Such capability is not available, for example, on vehicle-carrying frames of the type shown in Swartzwelder, U.K. Patent No. 1,006,496. In Swartzwelder, tiltable vehicle supports are used to conserve lengthwise frame space but the individual length of each support is fixed and must generally correspond, for economic reasons, to the average vehicle length in order that the Swartzwelder frame may efficiently carry the maximum number of standard-length vehicles. Frames of this type thus cannot be used for transporting vehicles of very large length, such as limousines, which have a length exceeding the average vehicle length.

Preferably, the extent of movement of a frame of improved design within its transport container will be less than that which is possible with the basic frame. Then, during transport of the improved frame, there will be less time for the container to acquire a velocity significantly higher or lower than that of the enclosed frame prior to any collision that might occur between the frame and the end walls of the container. As a result, the peak level of the shock forces generated during such collision will desirably be reduced.

During collision between a frame and its container, the structure most in need of protection is the end door of the container, which is typically made of lighter construction than the sides and opposite end wall of the container in order to facilitate handling of the door by the transport operator. The need for protection of the end door is particularly great during the return transport of empty frames. In practice, up to six side-by-side collapsed frames can be loaded at one time inside the container for return transport. The total mass of this large number of frames is even greater than that of a single frame which has been fully loaded with vehicles so that during the transport of empty frames, there is the potential for even larger shock forces to be generated.

One approach which has been used for limiting movement of the frame inside its container in order to protect against shock damage uses an L-shaped mechanism having adjustable vertical and horizontal portions. This mechanism, which was developed by one of the present applicants, mounts on each rear corner of the frame opposite the end of the container that includes the door. The possibility of shock damage to the door is completely foreclosed by the vertical portion, which adjusts in height so that the horizontal portion is raised above the door to a position extending across from the upper container margin that borders the door. Normally this upper margin is of heavier construction than the door itself and is therefore less susceptible to shock damage. Further protection against shock damage is provided by screw adjustment of the horizontal portion which brings the head end of that portion in close-proximity to the upper margin, thereby limiting the extent of movement of the frame within the container and reducing the peak levels of shock force generated during frame and container collisions.

However, the L-shaped structure of the mechanism just described can cause a large bending moment to develop across the upper lengthwise rails of the frame, causing this lengthwise assembly to buckle or crack, particularly since there is no attaching structure, such as the wheels found on the lower rails, through which this bending moment can be resolved. Furthermore, if an attempt is made to decrease the risk of structural damage to the frame by using heavier upper rails, this modification results in a more massive frame and the development of even greater shock forces, which forces will act in a cumulative manner on the container during the return transport of empty frames. Moreover, this L-shaped mechanism increases the time needed in preparation for transport, particularly when there are several empty frames to be loaded inside the container, since each mechanism on each corner of each frame must be vertically and horizontally adjusted into its operative position proximate the upper margin to ensure that no shock damage occurs.

Another approach which has been used to provide protection to the container doors is the placement of removable cushioning pads between the container door and the frame. However, such pads are time-consuming to install. Also, to the extent that such pads are springably "stiff" enough to withstand the peak levels of shock force which can be generated, their placement makes it difficult to close the container door as necessary to wedge them into place. On the other hand, unless they are snugly wedged into place, such pads are able to work loose from their frame-blocking positions so that no protection at all is provided to the door.

Conceivably, both the problem of cushion slippage and the problem of difficult door closure could be solved by mounting hydraulic shock absorbers along the surface of the door where protection against shock damage is most needed. Surface-mounted shock absorbers of a type usable for this purpose, are available, for example, from Ace Controls, Inc. based in Farmington, Mich. As explained in their product catalog No. 48-10-91 (published in 1988), p. 8, contained inside such absorbers is a fluid that is forced through a series of narrow holes in order to absorb the force of impact. Accordingly, such absorbers would provide little opposition to a closing door provided that the door was closed gradually enough to allow sufficient time for the fluid to flow slowly through the narrow holes.

However, the type of shock-absorber just described is primarily intended for use in those applications where the exact point of impact is determined in advance, because one of the colliding bodies is on a track, or is otherwise limited to a predetermined path, as it travels toward the other body (refer, for example, to pages 34–41 of catalog No. 48-10-91 identified above). In the context of the present invention, sometimes less than the maximum number of empty frames are loaded into a container for return transport. Because these empty frames are not tightly packed together, their position can vary somewhat relative to the sides of the container, so that no stationary arrangement of shock-absorbers along the container door would adequately serve to protect the door. Moreover, shock-absorbers of the type described are relatively expensive, because of their close-tolerance, fluid-containing internal structures, and therefore do not appear practical for wide use.

Two further systems for preventing damage to container doors due to the movement of a cargo-carrying frame inside its container are shown in Hackney U.S. Pat. No. 3,667,635 and Kern U.S. Pat. No. 3,938,678. Hackney shows the use of a locking bar which has springably retractable ends. These ends fit into a pair of holes provided on opposite sides of the container adjacent the container door. The locking bar, therefore, blocks the approach of the frame toward the door. Kern shows a pin which drops through a hole provided on the lower rail of the frame into a hole provided within the floor of the container. The respective holes in the frame and the floor are so arranged as to keep the frame away from the door when the drop pin is in place. However, the door-protecting mechanisms of Hackney and Kern require that the cargo container be specially modified to receive the locking bar and drop pin, respectively. This approach is unworkable where the frame is to be shipped using preexisting modes of transport (e.g., by rail car, ship and truck) in which cargo containers of only a standard type are generally available.

Accordingly, an object of the present invention in at least preferred embodiments thereof is to provide a vehicle-carrying frame having an improved mechanism enabling fuller use of the available space inside each type of container which is to be used for transporting the frame.

A related object of the present invention in at least preferred embodiments thereof is to provide a mechanism of the above type that is compatible with flexible allocation of the lengthwise space of the frame in order to accommodate a wide range of vehicle sizes.

Another related object of the present invention in at least preferred embodiments thereof is to provide an improved mechanism for protecting the door of the above container against shock damage due to movement of the frame inside the container.

SUMMARY OF THE PRESENT INVENTION

The present invention overcomes the foregoing drawbacks of the prior art by providing an improved mechanism enabling full use of the available space inside each type of container which is to be used for transporting the frame.

In accordance with a first aspect of the present invention, the improved mechanism includes a length-adjusting mechanism on each respective side of the frame between the forward and rearward ends of the frame. These length-adjusting mechanisms enable the frame to be shortened or lengthened depending on the length of the container which will be used to transport the frame. Not only does this permit a greater number of vehicles to be loaded on the frame when a larger-sized container is available to receive the frame, but also this feature automatically reduces the movement of the frame inside such larger containers, thereby better protecting the doors of these containers against collision or shock damage. Furthermore, because the length-adjusting mechanisms permit expansion of the frame without the need to attach large and unwieldy clamp-on attachments to the frame, the frame can be prepared for loading with greater safety and in less time.

In accordance with a second aspect of the present invention, an improved door-protecting mechanism is provided on the frame. Although the structure most in need of protection is the door, by providing the door-protecting mechanism on the frame instead of the door, protection against shock damage can be maintained even if the transverse position of the frame varies relative to the door. In accordance with this second aspect, the door-protecting mechanism is of a type including a shock-absorbing mechanism to reduce the peak level of any shock force generated between the frame and the door.

In accordance with a third aspect of the present invention, an improved method is provided for transporting the vehicle-supporting frame. This method includes protecting the door from damage by providing a door-protecting mechanism on the frame and by closing the door while the door-protecting mechanism extends in a direction opposite to the door. This approach permits protection to be afforded not only to the door but to the frame.

In accordance with a fourth aspect of the present invention, the frame is provided with a length-adjusting mechanism on each side and, in association with each of these mechanisms, a friction-reducing mechanism which is so configured as to reduce the level of frictional resistance opposing the lengthwise shifting adjustment of each length-adjusting mechanism. Because the friction-reducing mechanism regulates the amount of force which must be applied to the frame for length adjustment, safety and speed during adjustment are increased. In particular, the respective ends of the frame are less likely to be pulled completely apart because of excessive force applied to these ends to overcome sticking or jamming of the length-adjusting mechanism. Also, with the friction-reducing mechanism in place, the length-adjusting mechanism can be moved smoothly to any of its predetermined settings without the need for tedious back-and-forth movements to reach each setting. Moreover, when the friction-reduction mechanism is used, it is possible to construct the frame using only a pair of lengthwise movable sections, even though such construction increases the degree of longitudinal overlap between the frame sections and hence would normally present a problem of sticking during frame adjustments.

In accordance with a fifth aspect of the present invention, each side of the frame is divided into a pair of sections, where each section includes a lengthwise-extending member and the members are coupled together shiftably in longitudinally overlapping relationship to each other. This two-section shiftable frame can be locked in its selected length setting even faster than, for example, a three-section shiftable frame.

In accordance with a sixth aspect of the present invention, a length-adjusting mechanism is provided on the frame together with a plurality of wheel supports, where at least one of these wheel supports is movable independently of any other support including to a central position located approximately midway between the forward and rearward ends of the frame. Hence, not only is the frame expandable in length for flexible accommodation of larger-sized vehicles, but also there is no central dead space in the frame which would limit the number of vehicle loading patterns available.

In accordance with a seventh aspect of the present invention, more efficient use is made of internal frame space by providing an improved end assembly on the frame for connecting the sides adjacent the forward end. In particular, the end assembly is reinforced by a plurality of brace members which are relatively arranged such that an open space is centrally defined between these members of sufficient size to receive the end of a vehicle. From the standpoint of vehicle loading patterns, then, the end assembly is effectively transparent, that is, vehicles can be loaded on the frame with their extreme ends in substantial alignment with the forward and rearward extremities of the frame.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a side elevational view of an exemplary adjustable frame, in accordance with the present invention, showing the frame suitably adjusted for insertion into a shorter-length container.

FIG. 2 is a partial enlarged view of the adjustable frame of FIG. 1.

FIGS. 7-8 are perspective views of a lower pinning assembly which is shown apart from and in its intended use on the frame, respectively.

FIG. 9 is an expanded elevational view taken along lines 9—9 in FIG. 1, showing lower lateral spacer assemblies of the frame of FIG. 1 in their intended use after the frame has been loaded into a standard cargo-carrying container which is also shown.

FIG. 11 is a partial enlarged view of the rearward end of the adjustable frame of FIG. 10 and also shows the preferred position of the frame relative to its transporting enclosure just after the door of the enclosure has been closed, in accordance with a preferred method of transporting the frame.

FIG. 12 is a partially sectional view taken along lines 12—12 in FIG. 11 showing details of a friction-reducing mechanism on the frame as well as, in side elevational view, a post member which has been specially modified to operate along that portion of the frame including the friction-reducing mechanism.

FIG. 13 is a partially sectional view taken along lines 13—13 in FIG. 11 showing how the lower rails of the respective end of the frame slidably cooperate and also showing, in side elevational view, a preferred pinning assembly for locking one frame section to the other.

FIG. 21 a perspective view of an exemplary wheel cradle for the adjustable frame of FIG. 10.

FIG. 22 is a sectional view taken along lines 22—22 in FIG. 21 showing details of the length-extension mechanism on one end of the wheel cradle.

FIG. 23 is a partial elevational view showing the rearward end of the adjustable frame of FIG. 10 where the frame has been modified so as to include an exemplary alternative bumper mechanism, as depicted with certain portions removed to reveal interior details, and an exemplary alternative lower locking assembly, as depicted primarily in hidden-line view, and further showing, in hidden-line view, a spring-loaded detent plunger included on the frame.

DETAILED DESCRIPTION OF THE PREFERRED EMBODIMENTS

FIG. 1 shows a side view of an exemplary embodiment of an adjustable frame 20 constructed in accordance with the present invention. As shown, a plurality of vehicles 22 can be loaded in two tiers on the frame. The frame includes spaced-apart sets of wheels 24 to facilitate movement of the frame into a standard cargo-carrying container after the frame has been loaded.

Figure 3:
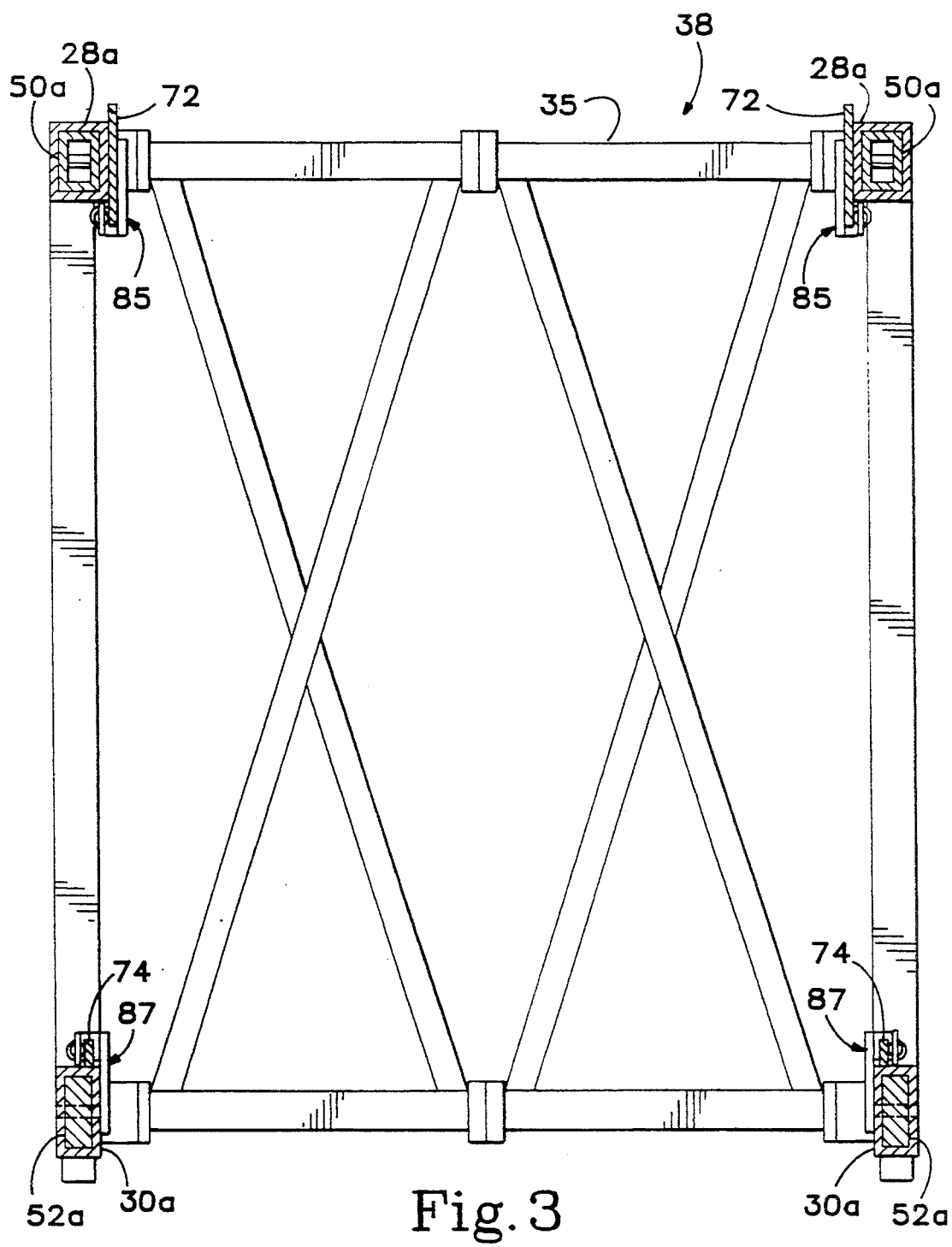
FIG. 3 is a sectional view taken along lines 3—3 in FIG. 2.

In several respects, the exemplary frame 20 is constructed in a manner similar to the construction of the frames which are described in U.S. Pat. No. 4,797,049, and U.S. patent application Ser. No. 07/784,902, filed Oct. 30, 1991, which are herein incorporated by reference. In particular, on each side of the elongate frame 20, the frame includes a plurality of upright brace or compression members 26 each supporting a respective longitudinally extending upper rail section 28a–b above a longitudinally extending lower rail section 30a–b. As shown in FIG. 1, from the upper rail sections 28a–b on each side of the frame, a plurality of post members 32, which are movable longitudinally along the rail sections, are suspended vertically, and at least one end hanger 34 is releasably locked in a desired vertical position on each post member 32 in order to carry a respective end of a wheel cradle (not shown) which extends across both sides of the frame. As was described in the Background section, each wheel cradle, in turn, supports either the forward or rearward pair of wheels of a particular vehicle 22. Referring also to FIG. 3, a two-panel centrally-hinged gate 35 located on the forward end 38 of the frame permits the respective sides of the frame to be brought to a closely-adjacent collapsed position after a spreader bar (not shown) at the rearward end 36 of the frame is first removed.

Figure 5:
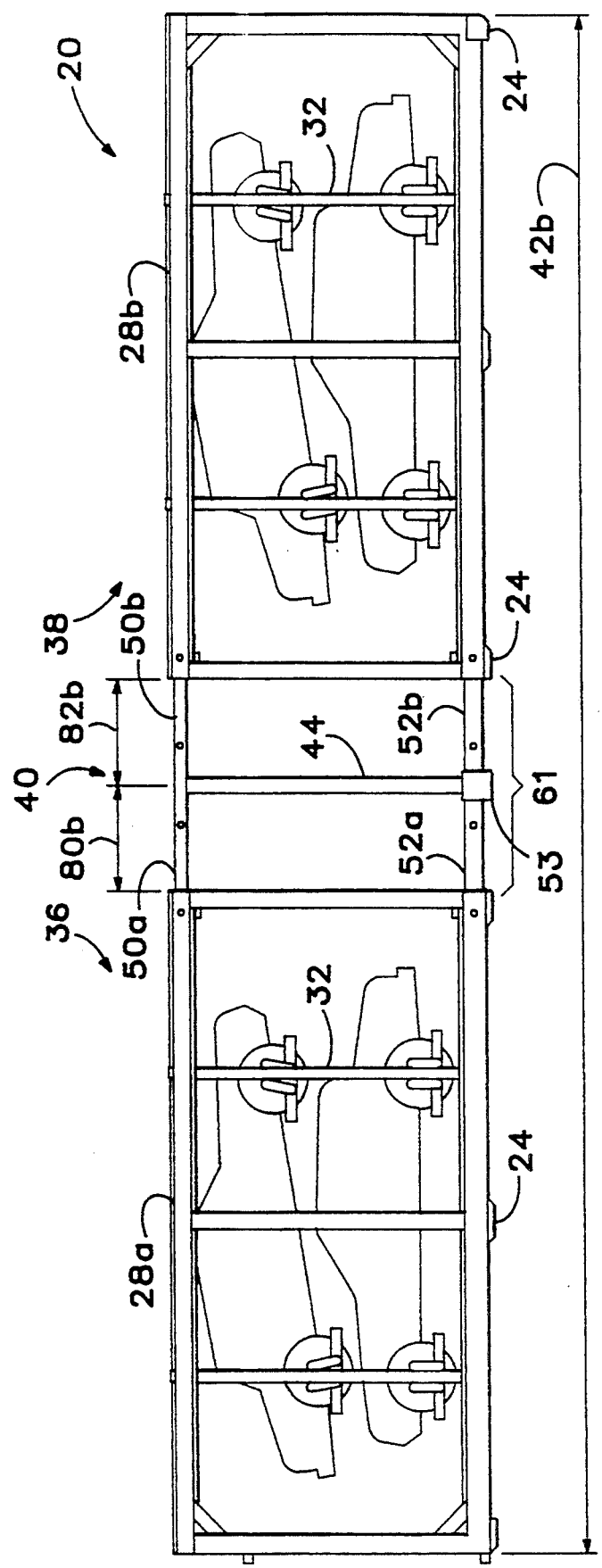
FIGS. 5-6 are side elevational views, similar to FIG. 1, but where the frame has been adjusted for insertion into a medium-length and longer-length container, respectively.
Figure 6:
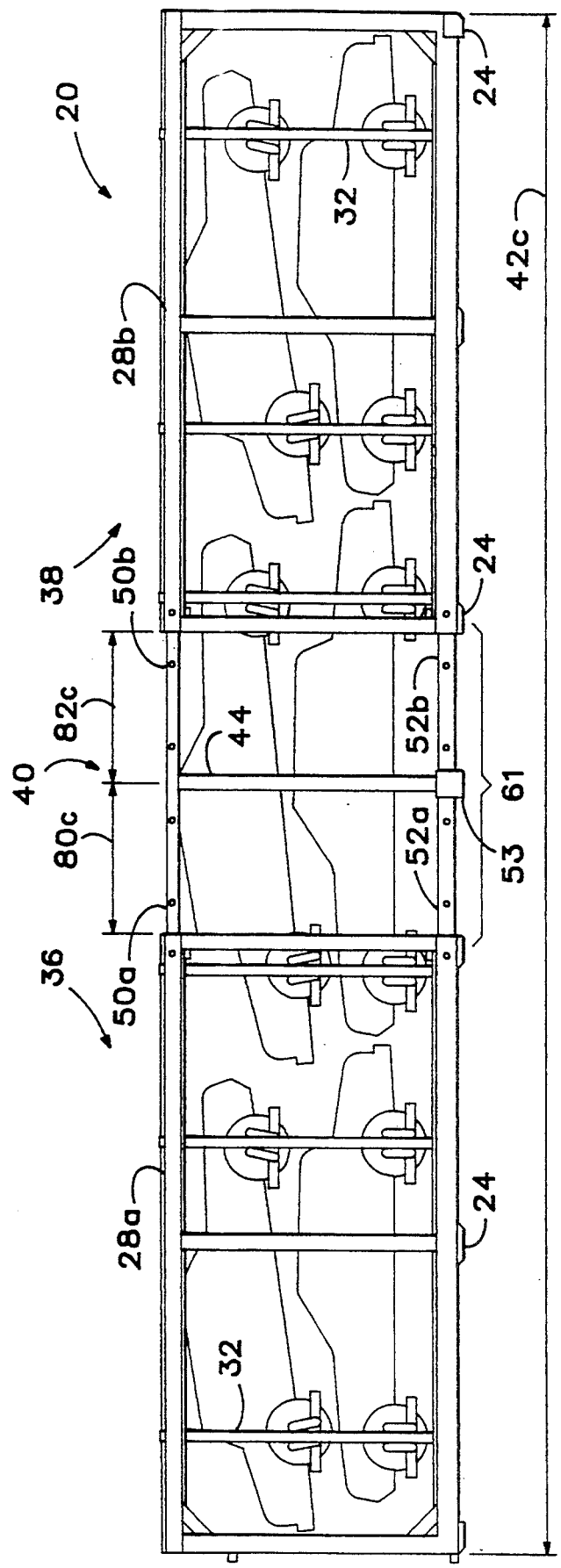

With respect now to the novel aspects of the frame, as shown in FIG. 1, on each side of the exemplary frame 20 both the upper and lower rails are partitioned into two longitudinally-separated sections. On each side, the rearward end 36 of the frame includes upper and lower rail sections which are respectively denoted by reference numerals 28a and 30a while the forward end 38 of the frame includes upper and lower rail sections which are respectively denoted by reference numerals 28b and 30b. Centrally carried on each side between the end 36 and the end 38 of the frame is a respective length-adjusting insert 40. Referring also to FIGS. 5 and 6, this length-adjusting insert enables the separation between the ends 36 and 38 to be adjusted so that the total length of the frame can be adjusted from a first length 42a of about 39 feet (FIG. 1) to a second length 42b of about 44 feet (FIG. 5) and then on to a third length 42c of about 47 feet (FIG. 6), for insertion into containers of 40, 45 and 48-foot lengths, respectively. The construction of the length-adjusting insert 40 and the mating surfaces of each end of the frame will now be described in detail.

Referring to FIG. 2, each length-adjusting insert 40 of the adjustable frame has a generally I-shaped construction. In particular, each insert includes an upright brace member 44 past the sides of which perpendicularly extend an upper pair of arms 50a and 50b, which are carried on the upper end of the brace member, and a lower pair of arms 52a and 52b which are carried on the lower end of the brace member. Referring also to FIG. 3, in the particular embodiment shown in the drawings, the upper pair of arms 50a and 50b are integrally formed on a single hollow-centered rail which is directly connected, as by welding, to the upper end of the brace member. The lower pair of arms 52a and 52b each comprise a solid rail and are connected, at their opposing ends, to a central wheel-box assembly 53 mounted on the lower end of the brace member.

In order to enable each insert 40 to be locked into adjustable positions on the frame, a plurality of longitudinally-spaced rearward and forward openings, respectively denoted by reference numerals 55a–c and 57a–c, are drilled through the lateral sides of each rearward and forward arm, respectively, of the insert. Viewing FIGS. 2 and 4 together, this is done so that respective ones of the rearward openings 55a, b, c, are located substantially the same lengthwise distance from the brace member 44 as corresponding ones of the forward openings 57a, b, c. The purpose underlying this arrangement will be made clearer below. The openings are further arranged, on the exemplary insert shown, so that the openings 55a–c and 57a–c on the upper arms 50a and 50b are vertically aligned with the correspondingly-numbered openings on the lower arms 52a and 52b.

With regard now to the ends 36 and 38 of the frame, as shown in FIG. 1, each respective side of the frame 20 is partitioned so that the ends are substantially matched in length. Accordingly, when the length-adjusting insert 40 is installed, the insert is positioned substantially in the center of each respective side. This placement of the insert maximizes the number of vehicles 22 which can be loaded onto the frame. To clarify this further, because the respective post members 32 are not suspendable from the upper pair of arms 50a–b of the exemplary insert now described, as they are from the upper rail sections 28a–b, the length-adjusting insert 40 defines a zone 61 along each side of the frame within which it is not possible to support the wheels of any vehicle. As shown in FIGS. 1, 5, and 6, having a wheel-free zone 61 in the center of each side, however, will not affect the normal three-vehicle, four-vehicle, or six-vehicle loading pattern. If, on the other hand, the wheel-free zone were positioned elsewhere, such as proximate an extreme end of the frame, the vehicles would need to be shifted longitudinally with respect to the foregoing loading patterns so that the number of vehicles that could be loaded on the frame would decrease.

Referring to FIG. 2, the respective upper rail sections 28a–b on one side of the frame together define a facing upper pair of open-ended hollow rectangular tubes 62a–b and, likewise, the respective lower rail sections 30a–b together define a facing lower pair of open-ended hollow tubes 64a–b. To install the length-adjusting insert 40, the upper pair of arms 50a–b of the insert are slidably inserted into the upper pair of open-ended tubes 62a–b, while, at the same time, the lower pair of arms 52a–b of the insert are slidably inserted into the lower pair of open-ended tubes 64a–b.

Figure 4:
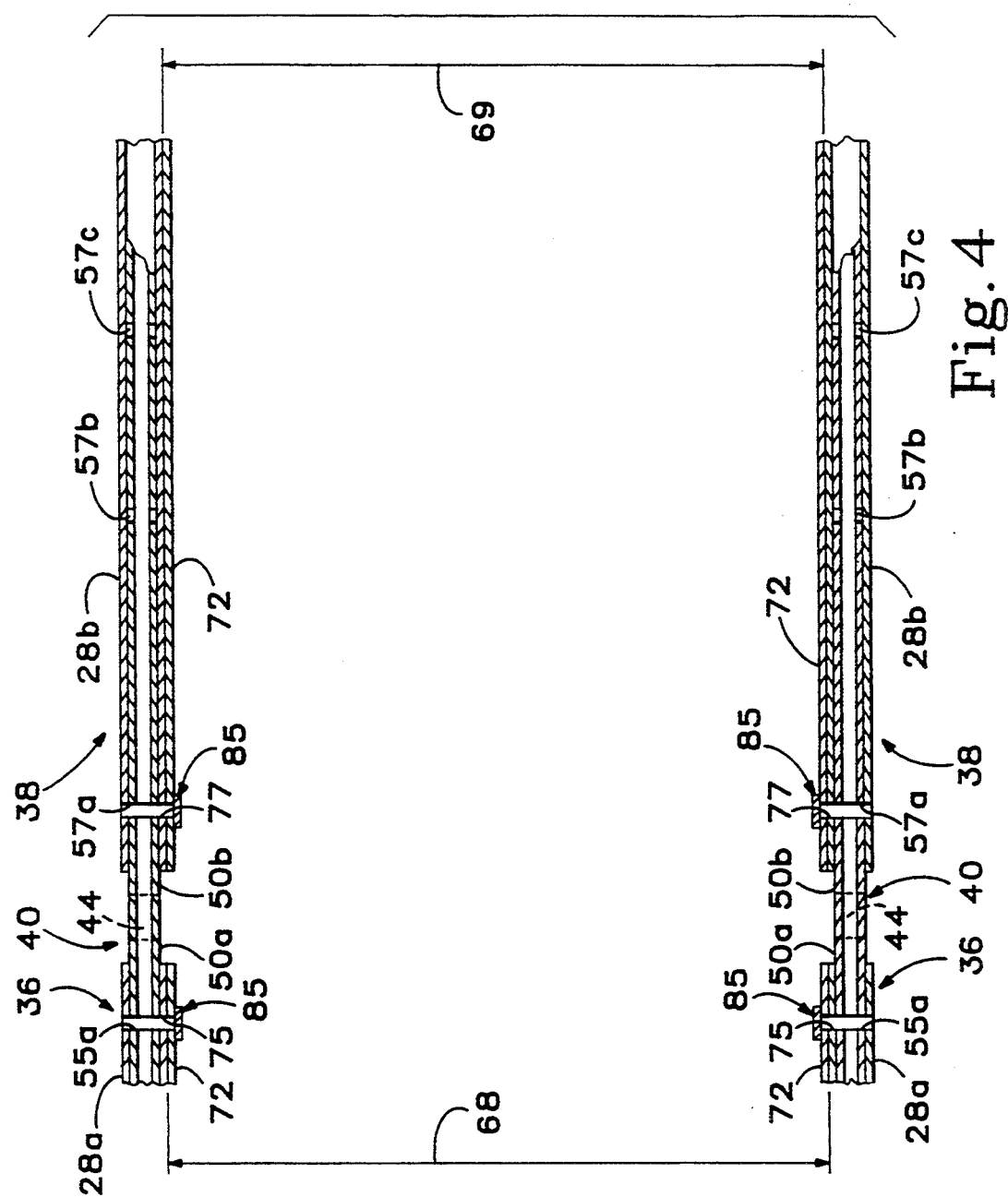
FIG. 4 is a sectional view taken along lines 4—4 in FIG. 2.

Referring now to FIG. 4, with the length-adjusting insert 40 slidably inserted into each end of the frame in this manner, the respective upper rail sections 28a of the rearward end 36 are maintained in end-to-end alignment with the corresponding upper rail sections 28b of the forward end 38. Similarly, the lower rail sections 30a of the rearward end are maintained in end-to-end alignment with the corresponding lower rail sections 30b of the forward end. These relationships, in turn, ensure that the side-to-side spacing 68 between respective rail sections of the rearward end will equal the side-to-side spacing 69 between respective rail sections of the forward end, so that wheel cradles of uniform side-to-side width can be used at either end.

Referring to FIGS. 2 and 4 together, the length-adjusting insert 40 enables relative movement between the respective ends 36 and 38 of the frame despite tension-member positioning structures on each end that overhang the upper and lower rail sections 28a–b and 30a–b. These include an upper and lower toothed plate 72 and 74, respectively. These two plates cooperate together to enable each post member 32 to be shifted between and to be locked in, quickly and without mishap, a plurality of longitudinally-spaced positions along the frame. Referring also to FIG. 3, on each respective side, the upper toothed plate 72 is mounted on the inward side of each upper rail section 28a–b and overhangs each respective upper rail section, while the lower toothed plate 74 is mounted on the upper side of each lower rail section 30a–b. There is no interference between these respective plates and the length-adjusting insert because the respective pairs of arms 50a–b and 52a–b of the insert move entirely within, and not along the outside of, the respective rail sections 28a–b and 30a–b. Were it not for this arrangement, the aforedescribed wheel-free zone 61 on each respective side would generally be over twice the length that is shown in FIG. 1 and FIGS. 5–6 so that commensurately fewer vehicles could be carried on the frame.

Another advantage of the above-described interconnecting system is that the length-adjusting insert 40, once installed, can be maintained in ready-to-use position between the respective ends of each side of the frame. This is so whether, for example, the frame 20 needs to be adjusted to fit a relatively shorter-length container (FIG. 1) or whether, instead, the frame needs to be adjusted to fit a relatively longer-length container (FIG. 6). There is no need, in particular, when transporting the frame in a shorter-length container, to separately transport removable clamp-on attachments in order to be ready to fit the frame into longer-length containers, nor is there a need, whenever the switch to longer-length containers is being made, to lift and manipulate into place attachments of this sort.

The rearward and forward ends 36 and 38 of the frame are adapted to be pinned to the arms of each length-adjusting insert 40 to enable each insert to be locked into place so that the frame will maintain a constant length. In particular, referring to FIG. 2, on each side of the frame proximate the insert-receiving edge of the rearward end 36, a pair of vertically-aligned rearward holes 75 are drilled, the first between the lateral sides of the rearward upper rail section 28a and the upper toothed plate 72 and the second through the lateral sides of the rearward lower rail section 30a. Likewise, on each side of the frame proximate the insert-receiving edge of the forward end 38, a pair of vertically-aligned forward holes 77 are drilled, the first between the lateral sides of the forward upper rail section 28b and the upper toothed plate 72 and the second through the lateral sides of the forward lower rail section 30b. As depicted, the rearward holes 75 have substantially the same lengthwise offset from the insert-receiving edges of the rearward end 36 as the forward holes 77 have from the insert-receiving edges of the forward end 38.

Referring to FIG. 2, upon shifting the rearward end 36 away from the length-adjusting insert 40, respective ones of the plurality of vertically-aligned pairs of rearward openings 55a, b, c are successively brought into registration with the vertically-aligned pair of rearward holes 75. Viewing FIGS. 1 and FIGS. 5–6 together, each such position of registration defines a corresponding rearward locking position 80a, b, c. Similarly, upon shifting the forward end 38 away from the length-adjusting insert 40, respective ones of the plurality of vertically-aligned pairs of forward openings 57a, b, c are successively brought into registration with the vertically-aligned pair of forward holes 77. Viewing FIG. 1 and FIGS. 5–6 together, each such position of registration defines a corresponding forward-locking position 82a, b, c.

As a result of the arrangements heretofore described of the rearward openings 55a, b, c, relative to the forward openings 57a, b, c and of the rearward holes 75 relative to the forward holes 77, respective ones of the rearward locking positions 80a, b, c are located substantially the same lengthwise distance from the brace member 44 as corresponding ones of the forward locking positions 82a, b, c. This allows the brace member to be locked into a position which is substantially centered longitudinally of each side of the frame regardless of which length adjustment has been selected. Accordingly, when vehicles 22 have been loaded on the frame, the compressive forces which act on each brace member 26 and on each brace member 44 will be evenly distributed between these members.

Referring to FIGS. 3 and 4, after the rearward and forward ends have been moved to a particular rearward and forward locking position, respectively, on each side of the frame, each end is pinned to the arms of the insert by upper and lower locking assemblies 85 and 87. Referring now to FIG. 7, each lower locking assembly 87 includes a main pinning member 89 and a separate self-locking pin 91. The main pinning member 89 includes a generally rectangular backing plate 93 from one side of which outwardly extends a generally cylindrical main pin 95 and a lug 97 of generally parallelipiped form except that the outermost edge 99 of the lug converges toward the rectangular plate at about a 30° slant in a direction moving away from the main pin. Referring to FIGS. 2 and 8, the main pin 95 is suitably dimensioned for close-fitting insertion between, for example, the forward hole 77 formed on the lower rail section 30b of the forward end 38 and a respective one of the forward openings 57a, b, c formed on the lower arm 52b of the insert 40, where the particular forward opening that is used will depend on which of the forward locking positions 82a (FIG. 1), 82b (FIG. 5), or 82c (FIG. 6) has been selected. In similar manner, every other rail section of each end of the frame is pinned to the corresponding arm of a respective insert.

Referring to the particular pinning position depicted in FIG. 8, lengthwise forces can act between the main pin 95 and the forward hole 77 which, unless protected against, can cause lengthwise wearing or elongation of the hole 77 which can, in turn, ultimately cause an excessive degree of play to develop between the insert and the forward end. To counteract this effect, the lug 97 is dimensioned and arranged on the plate 93, as shown, so that when the main pin is received in the hole 77, the lug is positioned for close-fitting insertion between a respective pair of the teeth 101 on the toothed plate 74. The teeth are preferably formed in the toothed plate using a burning torch, so that a hardened layer is developed along the edge of each tooth. Accordingly, the forces which might otherwise wear against the relatively softer drilled surfaces of the hole 77 are not able to wear against the relatively harder slotted surfaces of the toothed plate, and the main pin is held in nonvibratory position within the hole. The rearward or forward openings 55a–c and 57a–c on each lower arm 52a–b of the insert are also subject to such forces but are less susceptible to wearing than the holes 75 and 77 because the lower arms, being solid rails, have a greater length of material along the sides of their openings to resolve these forces.

Referring to FIGS. 7 and 8, in order that the main pin 95 and lug 97 do not back out of their respective pinning positions, the self-locking pin 91 is inserted through a hole 103 which is formed on the outer-most corner of the lug between the teeth-facing sides of the lug. This self-locking pin includes an elongate pin body 105, a head 107, and a ring 109 pivotably connected to the head by offset ends of the ring so that the ring is normally biased to a position immediately adjoining one side or the other of the pin body. Accordingly, after the self-locking pin is forced through the hole 103 on the lug, and after the ring has been swiveled, as shown in FIG. 8, in locked position over a corner of the lug (as facilitated by the slant of the outermost edge 99), the natural bias on the ring maintains this locked position. Concerning the upper locking assemblies 85 (FIG. 3), these locking assemblies are generally similar in construction to the lower locking assemblies 87 which have now been described, except for dimensional differences made necessary because of the different arrangements of the upper and lower toothed plates 72 and 74 and because the greater lateral thicknesses of the upper rail and arm members in comparison to the lower members.

Although not shown, each length-adjusting insert 40 can be optionally fitted with a pivotable set of post member positioning plates in order to enable mounting of post members in the wheel-free zone 61 when the frame is extended to its full length 42c as indicated in FIG. 6. Here each plate of the four-plate set comprises a shortened length of toothed plate, generally shaped like the plates 72 and 74 which are shown in FIG. 2. Each shortened plate is mounted, at one end, adjacent a respective end corner of the central brace member 44 for pivoting movement between a collapsed position adjacent and generally parallel to the brace member and a ready position adjacent and generally parallel to a corresponding one of the arms 50a, 50b, 52a, and 52b of the insert. A set of four pins are separately provided to releasably fasten the other end of each shortened plate to the corresponding arm of the insert in order to secure the plate in its ready position along that arm after the frame has been extended to its full length 42c as shown in FIG. 6. Post members 32 can then be mounted on each plate along the corresponding arm of the insert in consistent manner with the procedure by which they are mounted to the plates 72 and 74 along each end of the frame. Alternatively, in order to make room along the arms of the insert for adjusting the frame to a shorter length, the pins are removed and each shortened plate is pivoted downwardly away from its corresponding arm to its collapsed position adjacent the brace member.

Referring to FIG. 1 the adjustable frame 20 includes upper and lower lateral spacer assemblies 110 and 112 which are used to limit lateral movement of the frame inside a container into which the frame has been loaded for shipment. The frame may either be loaded by itself in its fully expanded condition or with other frames of like type where the sides of each frame have been collapsed into closely adjacent position in order, for example, that the return shipment of a large number of unloaded frames can be made. Referring also to FIG. 9, which shows the lower lateral spacer assemblies in a selected operative position for a single loaded frame, each left and right-hand spacer assembly (e.g., 112a and 112b) includes an elongate first hollow tube 114 of rectangular cross-section which is mounted in lateral extension from a respective corner brace member. 26 on the rearward end 36 of the frame. Inside of each first hollow tube 114, fitted for telescopic extension therefrom, is a second hollow tube 116 on the end of which is affixed a plate 118 or other type of head. Holes (not shown) are drilled in the upper sides of the first and second tubes so that a pin 120 can be used to variously set the lengthwise extension of the combined spacer assembly.

As shown in FIG. 9, in their extended positions, the left and right-hand spacer assemblies 112a and 112b oppose or limit movement of the frame in either lateral direction toward the left or right sidewall 122a or 122b, respectively, of the container. Alternatively, where a number of frames have been loaded in collapsed condition inside a container, the left-hand spacer of the collapsed frame which is nearest to the left sidewall of the container and the right-hand spacer of the collapsed frame which is nearest to the right sidewall of the container can both be extended in order to achieve the movement-limiting effect.

Figure 10:
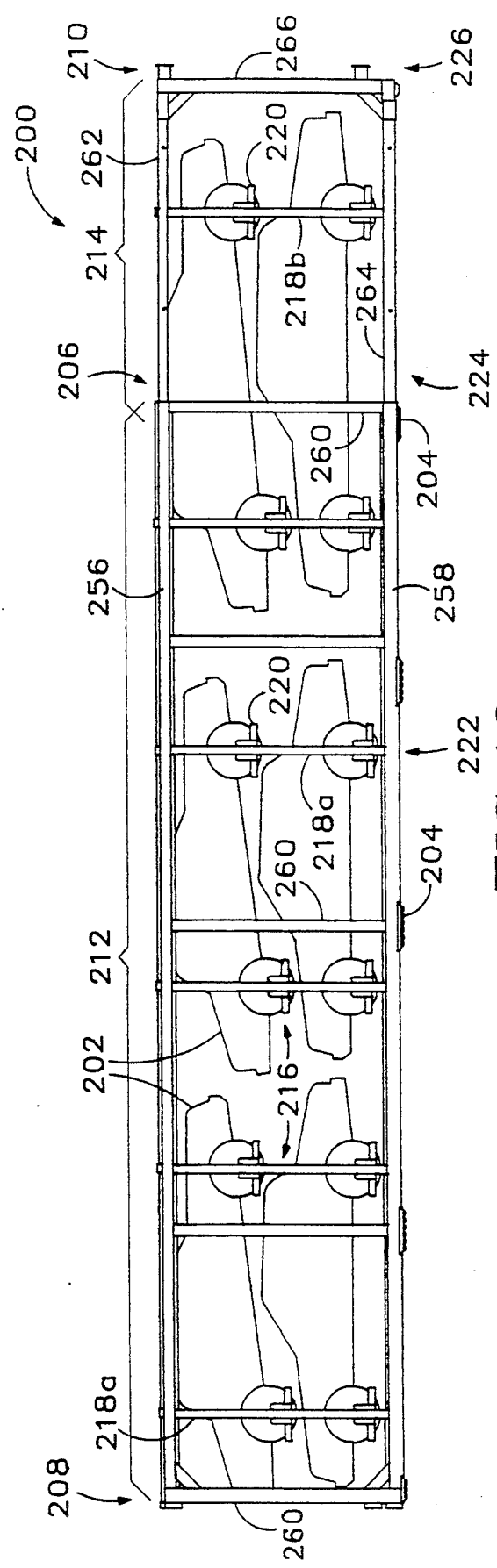
FIG. 10 is a side elevational view of an alternative preferred embodiment of the adjustable frame, showing the frame suitably adjusted for insertion into a larger-length container.

FIGS. 10–26 show different views of an alternative exemplary embodiment of the adjustable frame. Referring to FIG. 10, this second frame embodiment 200, like the first frame embodiment 20 described above, is able to support a plurality of vehicles 202 in two tiers on the frame and, similarly, has movement means underlying its sides, comprising spaced-apart sets of wheel assemblies 204, to facilitate movement of the frame into a standard cargo-carrying container after loading of the frame with vehicles.

Like the first frame embodiment 20, the second frame embodiment 200 includes a length-adjusting mechanism 206 that enables lengthwise shifting adjustment of the position of the forward end 208 of the frame relative to the rearward end 210, where the term "end" is here understood as signifying an extremity defined by the sides of the frame. However, this length-adjusting mechanism 206, unlike that of the first frame embodiment, does not include a central length-adjusting insert 40, as shown in FIG. 6. Instead, each side of the frame is divided into only a pair of sections consisting of a forward section 212 along the forward end 208 and a rearward section 214 along the rearward end 210. The length-adjusting mechanism 206 directly incorporates respective lengthwise members on these two sections, as further described below, so that no separate center section is required.

The second frame embodiment 200, like the first frame embodiment 20, includes a plurality of wheel-supporting assemblies 216, where each wheel-supporting assembly is movable along its respective section 212 or 214 independently of any other wheel-supporting assembly. In accordance with this feature, the lengthwise space of the frame 200 can be allocated flexibly in accordance with the particular lengths of the vehicles to be carried. Also, as in the first frame embodiment, each wheel-supporting assembly includes a pair of post members 218a or 218b suspended vertically in positions opposite each other on respective sides of the frame. Each post member supports at least one end hanger 220 which is releasably locked to that member at a desired wheel-supporting height. Each pair of opposite end hangers, in turn, support the ends of one wheel cradle 221 (FIG. 21), which is preferably made of lightweight aluminum. Each wheel cradle therefore extends across the sides of the frame in suitable position for supporting a pair of wheels of a respective vehicle.

In contrast to the first frame embodiment 20, in the second frame embodiment 200 the forward section 212 and the rearward section 214 are not equal in length. Instead, the forward section is considerably longer than the rearward section, which places the length-adjusting mechanism 206 off to one side of the center of the frame. In further contrast to the first frame embodiment, in the second frame embodiment 200, at least one of the wheel-supporting assemblies is movable between a plurality of longitudinally-spaced wheel-supporting positions that include a central position 222 located approximately midway between the frame's forward and rearward ends 208 and 210, respectively. In other words, the second frame embodiment 200 provides support for the wheels of a vehicle even when these wheels are in the center of the frame. Thus, the second frame embodiment can flexibly accommodate vehicle loading patterns that are not available with respect to the first frame embodiment. This can be readily seen by comparing FIG. 6 to FIG. 10. As shown in FIG. 6, longer-length vehicles cannot be supported along either end of the first frame embodiment 20 without crowding out the center vehicle because no wheel support is available for this center vehicle along the center "dead space" of that frame.

The second frame embodiment 200 includes an improved door-protecting mechanism 224. In part, this door-protecting mechanism is like that provided in the first frame embodiment 20 insofar as it includes the length-adjusting mechanism 206. In other words, when either frame embodiment is received inside a larger-sized container, the length-adjusting mechanism can be used to expand the frame so that it more fully occupies the empty space inside the larger container. As a result, if the container is subjected to sudden acceleration, there will be less time for the container to acquire a velocity significantly higher than that of the enclosed frame prior to any collision between the frame and the container door. Accordingly, the peak level of any shock forces generated during this collision will be reduced. However, unlike the first frame embodiment 20, the second frame embodiment 200 further includes a new bumper mechanism 226 which contains a shock-absorbing mechanism, as described more fully below. Using this bumper mechanism, an even larger reduction can be achieved in the peak level of the shock forces generated during collisions between the frame and the container door.

Figure 18:
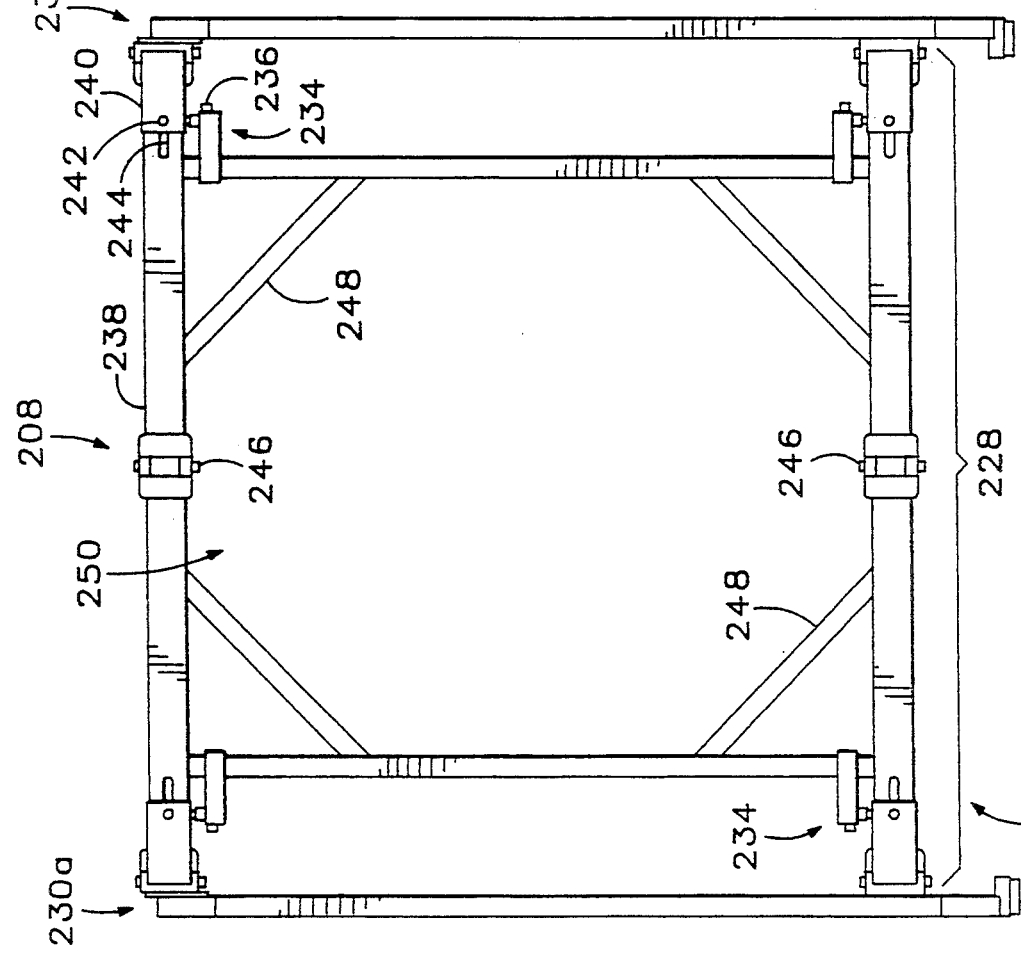
FIG. 18 is an elevational end view of the forward end of the frame of FIG. 10.

FIG. 18 shows an end elevational view of the forward end 208 of the second frame embodiment 200 shown in FIG. 10. As shown in FIG. 18, an end gate assembly 228 is transversely connected across the sides 230a and 230b of the second frame embodiment for transverse support of these sides. This end gate assembly includes a width-adjusting mechanism 232. This width-adjusting mechanism includes a plurality of screw-adjusting assemblies 234 which, when actuated by rotation of a screw head 236, force telescoping movement to occur between a tubular center member 238 and a larger tubular end member 240, both of which belong to the end gate assembly. This allows the sides of the frame to be expanded so as to better utilize the available transverse container space. Each end member 240 carries a pin 242, the limits of travel of which are set by a slot 244 defined in the corresponding center member, so that the end limits of this width expansion are well-defined and the end gate assembly remains safely connected throughout its adjustment.

Referring to FIG. 21, consistent with this transverse expandability of the frame sides, each wheel cradle 221 preferably includes a length-extension mechanism, which desirably includes a parallel pair of tire-supporting bars 402 at each end 403a, b, of the wheel cradle. Each bar preferably includes a telescoping inner and outer section 404 and 406, respectively, where a pin 408 extending inwardly of the hollow outer section 406 engages a slot 410 formed in the solid inner section 404 so as to limit the travel of the inner section such that the wheel cradle is adjustable for the two standard enclosure widths available (96 inches for 40- and 45-foot enclosures and 102 inches for 48-foot enclosures). A plate 412 preferably extends across each pair of bars immediately adjacent the telescoping end of each outer section 406 for reinforcement.

The width-adjusting mechanism 232 further includes center hinges 246 which enable movement of the sides between the open position shown in FIG. 18, in which the sides are transversely spaced apart sufficiently to support vehicles therebetween, and a collapsed position (not shown) in which the sides are compactly positioned closely adjacent transversely to each other. In other words, like the first frame embodiment 20, the second frame embodiment 200 is collapsible in width in order that a number of empty frames, normally up to six at a time, can be closely packed in side-by-side arrangement into a single container for return transport. Because of their combined mass, this large number of frames can generate even higher shock forces than is possible with even a fully loaded single frame during any collision they may have with the container door. It is significant, therefore, that the door-protecting mechanism 224 of the second frame embodiment 200 includes both a length-adjusting mechanism 206 and a shock-absorbing bumper mechanism 226 because the combined force-reducing effects of these two mechanisms ensure that the container will be able to safely tolerate a full load of empty frames without any damage to its door.

Comparing FIGS. 3 and 18, it will be recognized that the end gate assembly 228 of the second frame embodiment differs from the gate assembly 35 of the first frame embodiment not only in having additional adjusting assemblies, but also in its overall geometry as well. In particular, the brace members 248 which reinforce the end gate assembly 228 are arranged relative to each other such that an open space 250 is centrally defined between these brace members of sufficient size to receive the end of a vehicle. In other words, referring also to FIG. 19, this open space permits even fuller utilization of the lengthwise space inside the frame because the end assembly 228 is effectively "transparent" from the standpoint of the vehicles being loaded. Accordingly, the end of each vehicle, as indicated, can be brought to a position in substantial alignment with the endmost extremities 252 on each side of the frame.

Referring to FIGS. 10 and 11 together, the forward section 212 of the second frame embodiment includes, on each side, a tubular lengthwise-extending upper rail 256 and a tubular lengthwise-extending lower rail 258, which rails are held vertically apart, including at each end, by a plurality of upright brace members 260. On the other hand, referring also to FIG. 12, the rearward section 214 includes, on each side, a solid lengthwise-extending upper rail 262 and a solid lengthwise-extending lower rail 264 which are held vertically apart, but only at one end, by a rearwardmost upright brace member 266. As shown in FIG. 11, the upper and lower rails 262 and 264 of the rearward end are suitably sized for insertion into the tubular upper and lower rails 256 and 258 of the forward end. Such insertion couples together the forward and rearward ends for lengthwise shifting adjustment relative to each other. More specifically, the lengthwise rails 262 and 264 on the rearward end slidably move telescopically inside the lengthwise rails 256 and 258, respectively, of the forward end. In order to facilitate such movement, the tubular rails 256 and 258 on the forward end are so processed as to remove any excess weld seam material or flash along their interiors, at least over that portion of each tubular rail that is directly subject to telescoping engagement of the type described. Each of these lengthwise-extending rails 256, 258, 262 and 264 are component members of the length-adjusting mechanism 206.

Referring to FIG. 5, it will be recognized that with respect to the first frame embodiment 20, the lengthwise extending rails along each end, such as 28a and 28b, are not in longitudinally overlapping relationship to each other, as is the case with the second frame embodiment. Instead, in the first frame embodiment, the lengthwise rails on each end are separated longitudinally from each other because each shifts telescopically along a different side of a center insert 40. Overhanging structures are removed from this insert to accommodate this shifting. As noted above, in the absence of further modification, this arrangement results in a dead space in the center of the frame and also increases the time needed for frame adjustment since each end section must be separately pinned, both at upper and lower locations on each side, to the center insert. On the other hand, referring again to FIG. 11, with respect to the second frame embodiment 200, there is only one pair of upper and lower pinning locations which need to be pinned on each side in order to immovably lock the end sections of the frame. That is, depending on which size of enclosure is available, either pinning locations 268a and 270a (for a 40-foot enclosure) or 268b and 270b (for a 45-foot enclosure) or 268c and 270c (for a 48-foot enclosure) are used.

In the preferred embodiment shown in FIG. 11, each pinning location corresponds to an upper or lower pinning hole (e.g., 272 or 274) formed on a respective lengthwise rail of the rearward section 214 of the frame. During a particular pinning operation, a selected pair of these holes is aligned with the corresponding holes 276 and 278 provided on the forward section and formed on the inward side of the upper and lower rails 256 and 258. The two sections are then locked or pinned together, preferably using a locking assembly of the type 280 shown in FIG. 13 and of the type 412 shown in FIGS. 25–26.

Referring to FIG. 13, the first type of preferred locking assembly 280 includes a rectangular plate 282. Attached to one side of this plate is a U-shaped bar 284 suitably shaped for use as a handle. Attached to the other side of the plate is a pin 286 which projects outwardly from the plate 282. Referring to FIGS. 11 and 13 together, to perform the pinning operation with respect to a selected one of the upper or lower holes 276 or 278, the pin 286 of the locking assembly is first inserted through the selected hole, such as lower hole 276, in the manner shown in FIG. 13, until the rectangular plate 282 comes to rest against the backing plate 288 mounted on the inward side of the lower rail 258. To prevent the locking assembly from backing out of the hole, the adjacent upright brace member 260 includes a pair of inwardly extending posts 290, one proximate each pinning hole 276 or 278, and the plate 282 includes an opening 292 that allows the plate to slide onto the post. A self-locking pin 294, inserted through an opening (not shown) in the end of the post 290, keeps the locking assembly 280 in place. The self-locking pin is itself held in place by folding its locking ring 296 over the post.

Figure 26:
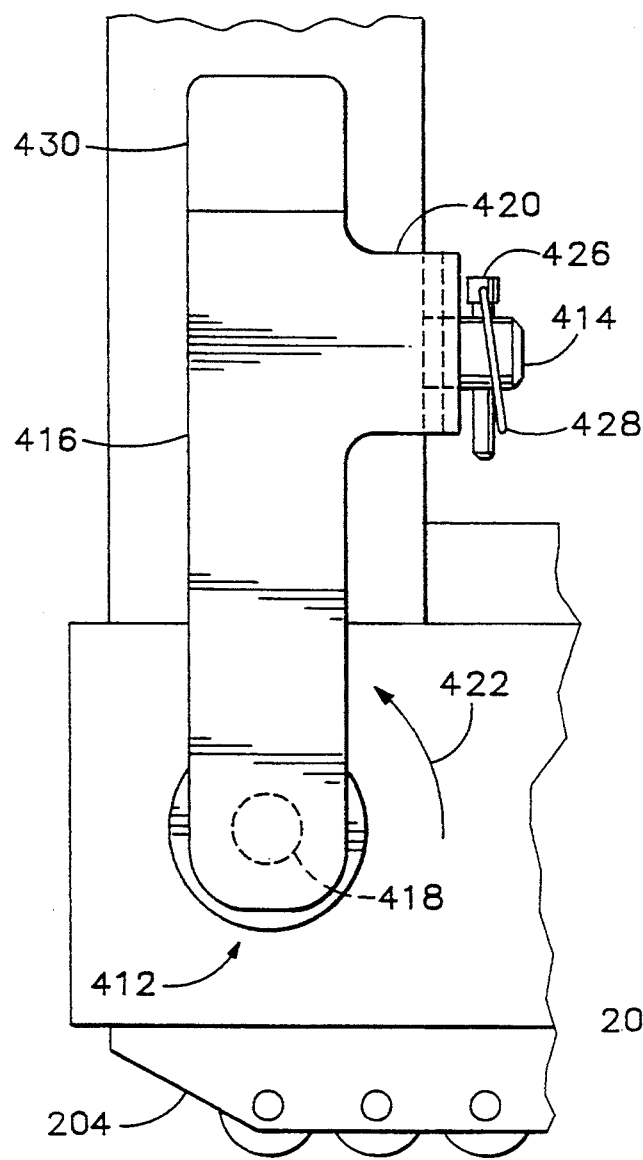
FIG. 26 is an elevational view of the exemplary alternative lower locking assembly of FIG. 23 as seen from a position inside the frame.
Figure 25:
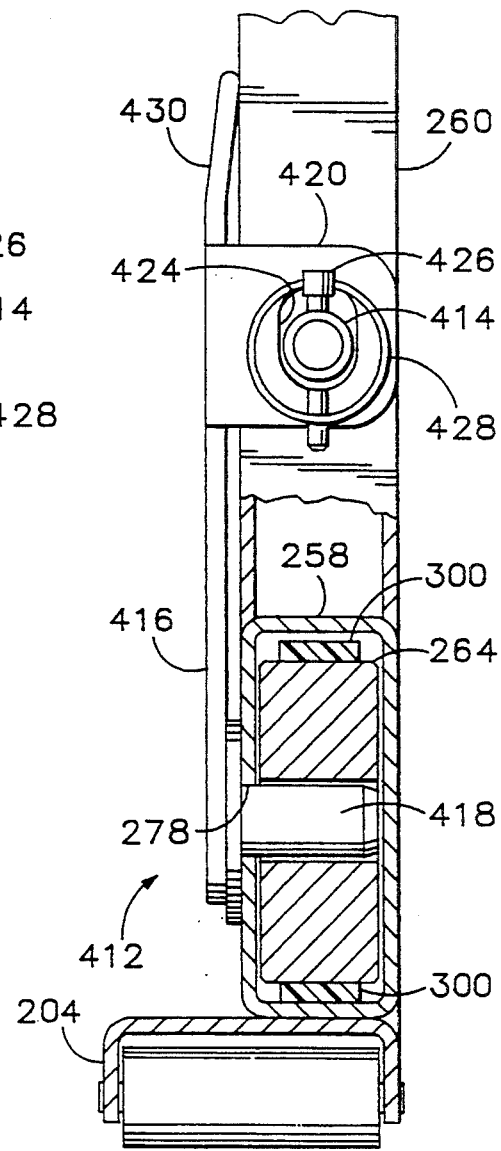
FIG. 25 is a sectional view of the exemplary alternative lower locking assembly taken along lines 25—25 in FIG. 23.

In accordance with the locking procedure indicated in FIG. 13, the first type of preferred locking assembly 280 is shown in its fully inserted position within the lower pinning hole 278, which locks together the respective lower rails 258 and 264, and an equivalent locking assembly is similarly inserted through the upper pinning hole 176 for locking together the respective upper rails 256 and 262. Thus, the same type of locking assembly can be used for locking both the upper and lower rails. However, in accordance with another preferred locking procedure, the first type of preferred locking assembly 280 is used only for locking of the respective upper rails 256 and 262, and a second type of preferred locking assembly 412, shown in FIGS. 25 and 26, is used to lock together the respective lower rails. As indicated in FIGS. 25 and 26, the particular advantage of this second type of locking assembly 412 is that this assembly is capable of being secured in place using a longitudinally extending lower post 414 on the upright brace member 260, that is, there is no need for the lower post on the upright brace member to extend inwardly of the frame in the manner of the post 290 shown in FIG. 13. Accordingly, the second type of locking assembly 412 enables additional clearance to be provided between the transversely-spaced lower members of the second frame embodiment 200 for easier insertion of vehicle-moving sleds and the like.

As shown in FIGS. 25–26, the second type of preferred locking assembly 412 includes an elongate rectangular plate 416 from the lower end of which outwardly projects a pin 418 for insertion into the lower pinning hole 278 in order to lock together the respective lower rails 258 and 264. Proximate its upper end, the rectangular plate includes a sidearm portion 420. This sidearm portion is bent at a 90° angle so that after the pin 418 of the locking assembly has been fully inserted into its locking position, as shown, the sidearm portion can be pivoted about the pin, in the direction 422 indicated, in order to position an opening 424 formed on the sidearm portion over the longitudinally extending lower post 414. A self-locking pin 426 inserted through an opening (not shown) in the end of the post 414 then secures the locking assembly 412 in place, that is, it keeps the pin 418 from backing out of its fully inserted locking position. The self-locking pin 426 is itself, held in place by folding its locking ring 428 over the post. The upper end 430 of the rectangular plate is bent outwardly at a shallow angle relative to the plane of the lower portion of the plate so that when the pin 418 is in its fully inserted position, as shown in FIG. 25, there are no corners formed by the plate by which objects inside the frame could snag the plate.

Referring again to FIG. 11, the total lengthwise distance between pinning locations 268a and 270a, on the one hand, and 268b and 270b, on the other, is about 5 feet in order that the total length of the frame can be adjusted from its shortest setting of about 39 feet to its intermediate setting of about 44 feet. Similarly, the distance from pinning locations 268b and 270b, on the one hand, and 268a and 270a, on the other, is about 3 feet in order to permit frame adjustment from the intermediate setting of about 44 feet to the longest setting of about 47 feet. This means that the maximum extent of longitudinal overlap between the corresponding rails of the respective forward and rearward sections 212 and 214 exceeds 8 feet (which covers the approximate distance between pinning locations 268a and 268c, for example).

With respect to the first frame embodiment 20 shown in FIG. 6, the maximum extent of overlap between either end section and the center section 40 is approximately half that of the second frame embodiment 200. Accordingly, with respect to the second frame embodiment, one might expect that the operation of its length-adjusting mechanism 206 would be hampered by a tendency to stick or jam, particularly since these difficulties may arise even with respect to the first frame embodiment 20. However, these difficulties have been avoided because the length-adjusting mechanism 206 has been further improved by the addition of a friction-reducing mechanism 298.

In the preferred embodiment shown in FIGS. 11–12, the friction-reducing mechanism is composed of four lengthwise-extending ¼-inch-thick strips 300 each preferably of UV-resistant ultrahigh molecular weight (UHMW) polyethylene. Each strip is attached, as by a plurality of countersunk screws 302, along the upper or lower surface of either the solid upper rail 262 or the solid lower rail 264. Such strips are commercially available for purchase and are sold, for example, by Solidur Pacific Company based in Portland, Oreg.

FIG. 13, shows how the solid lower rail 264 is telescopically fitted inside the tubular lower rail 258 and further indicates how shifting adjustment of these respective rails is facilitated by the highly smooth face of the lower UHMW strip 300, which strip is attached, as described above, along an operative surface of the solid rail. The UHMW strip enables the tubular rail to slide along the solid rail with little frictional resistance. Indeed, the strips of the friction-reducing mechanism reduce the level of frictional resistance to a sufficient extent that the tubular rails 256 and 258 are able to slide smoothly over the entire 8 foot distance that separates the furthest pinning locations (e.g., 268a and 268c). As a consequence of this effect, the friction-reducing mechanism allows the second frame embodiment to be successfully constructed using only two frame sections 212 and 214, and thus is responsible for the particular benefits derived from that construction.

The friction-reducing mechanism 298 provides other benefits as well. First, the mechanism enables faster readjustment of the length setting because it reduces the level of force needed to initiate shifting adjustment and hence eliminates the need for imprecise back-and-forth adjustments to compensate for adjustment overshoot during alignment of the pinning holes. Moreover, the friction-reducing mechanism brings added safety to the frame adjustment since it eliminates the need to apply an unduly large force to the forward and rearward sections 212 and 214 of the frame in order to dislodge these sections from a jammed position. This, in turn, reduces the likelihood that these sections will be pulled completely apart.

Figure 24:
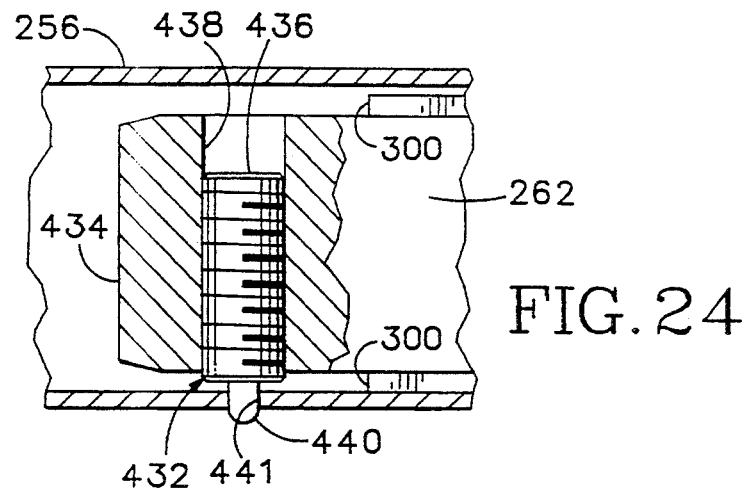
FIG. 24 is a longitudinal sectional view of the spring-loaded detent plunger of FIG. 23 in its engaged position.

Referring to FIGS. 23 and 24, further protection against pull-apart of the forward and rearward sections is desirably provided by a spring-loaded detent plunger 432 located on the upper solid rail 262 adjacent the forward (telescoping) end 434 of that rail. The detent plunger is of conventional type as sold, for example, under Model No. 103-60 by All American Products Company based in Glendale, Calif. The detent plunger includes a threaded base portion 436, by which it is screwably mounted inside a hole 438 formed adjacent the forward end 434, and further includes a spring-operated tip 440. If the forward and rearward sections are pulled past their longest length setting, the tip 440 of the detent plunger automatically engages a hole 441 on the corresponding tubular rail 256. In addition, the forward portion of each solid rail 262 and 264 extending past the corresponding locking hole 276 and 278 is preferably marked with a warning indicator, such as yellow or red paint.

With respect to the nature of the materials used in the friction-reducing mechanism, it will be recognized that the preferred material, UV-resistant UHMW polyethylene, can be easily wiped clean. Nor is this durable material susceptible to rust or corrosive agents of the type likely to be encountered during transit. Accordingly, the exemplary friction-reducing mechanism provides trouble-free operation while requiring minimal maintenance.

Figure 20:
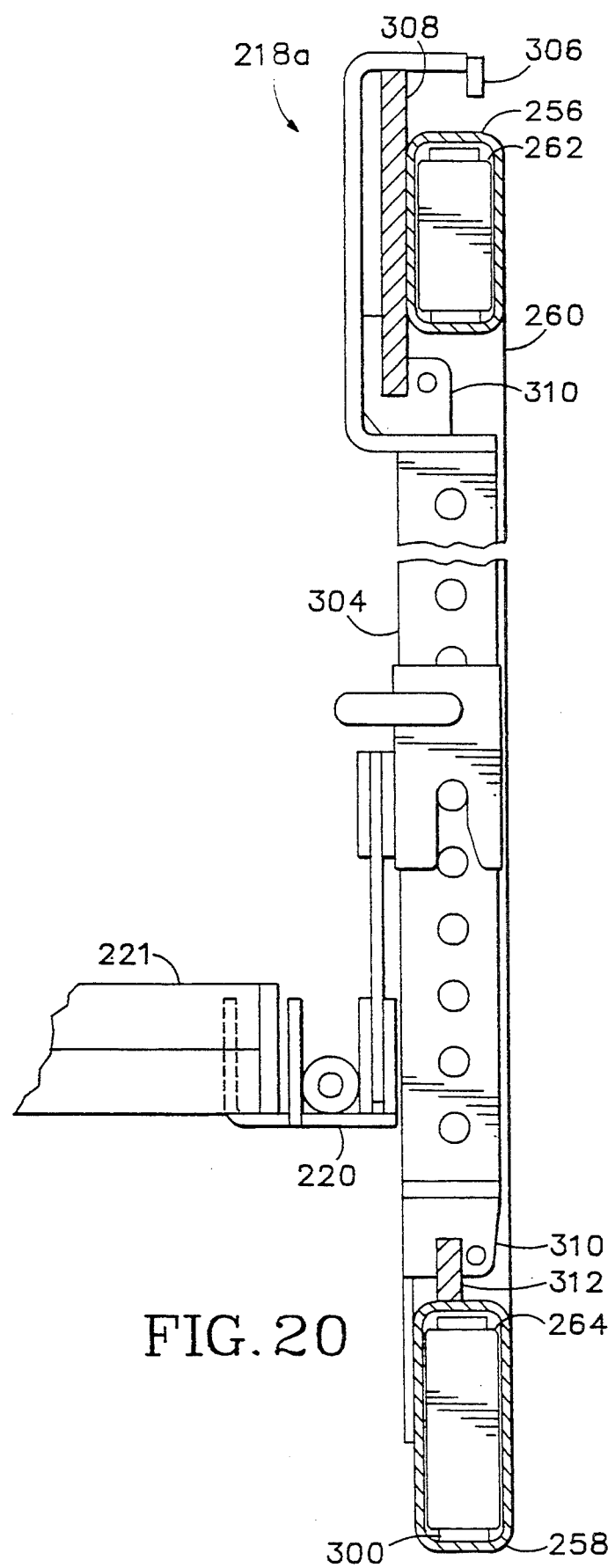
FIG. 20 is a partially sectional view taken along lines 20—20 in FIG. 11 showing, in side elevational view, another type of post member used with the frame of FIG. 10.

Referring to FIG. 11, the post members that are used on the second frame embodiment 200 are of two types which are respectively denoted by reference numerals 218a and 218b. The first type 218a is further described in U.S. patent application Ser. No. 07/784,902 incorporated by reference hereinabove. Referring also to FIG. 20, post member 218a includes an elongate beam 304 to provide support for an end hanger 220. The post member 218a further includes a hook portion 306 which is suspended vertically from the upper edge of a toothed upper plate 308 mounted on the backside of the upper rail 256. The post member 218a also includes a pair of outwardly projecting lugs 310 which are sized to fit between the respective teeth of the toothed upper plate 308 and also the corresponding teeth on a toothed bottom plate 312 mounted to the lower rail 258. Locking pins (not shown) are inserted through openings in the lugs to keep the post member locked to the upper and lower plates, and hence to the upper and lower rails.

The hook portion 306 is deeper than the upper edge of the upper toothed plate 306 so that the post member 218a can remain suspended while it is being pushed inwardly of the frame to draw its lugs to a position behind the teeth. The post member can then be shifted along the rail section and pulled back outwardly to reposition its lugs between different teeth. At no time in this sequence of operations is it necessary to lift the post member 218a off the frame.

As noted above, the solid rails 260 and 262 on each side of the rearward section 214 slide telescopically inside the tubular rails 256 and 258 on each side of the forward end 212. This telescoping movement forecloses the placement of overhanging structures, such as upper and lower toothed plates, on the solid rails 262 and 264. In the first frame embodiment 20 shown, for example, in FIG. 5, because of similar telescoping interaction between frame members, no toothed plates are mounted along the arms 50a and 50b of the center insert 40. With respect to the particular frame structure illustrated in that figure, no mechanism is shown for permitting the positioning of a wheel supporting assembly anywhere along the center insert 40. With respect to such structures, the second type of post member 218b enables maximum flexibility in the positioning of wheel-supporting assemblies since it is capable of suspension from the inner member of a telescoping pair of rails.

Referring to FIGS. 11 and 12 together, the second type of post member 218b includes an elongate beam 314 having vertically spaced openings formed therein in order that one or more end hangers 220 (FIG. 20) can be releasably pinned to the beam at desired vertical positions thereon. The ends of the elongate beam 314, which beam is of hollow tubular construction, are capped, as shown, and a rectangular tail piece 316 extends downwardly from the lower end of the beam for placement opposite and against the solid lower rail 264 of the frame.

The post member 218b further includes an upper portion 318 having a pair of side-engaging plates 320. These plates enable movement of the upper portion upwardly or downwardly relative to the elongate beam 314 in accordance with the limits of travel of a cross pin 322 which is connected across the plates and which is retained within a slot 323 formed on the elongate beam. The upper portion 318 further includes an upper hook portion 324. When the upper portion is lowered from its uppermost position, this upper hook portion latches over the upper friction-reducing strip 300 located on the upper rail 262.

In order to allow the post member 218b to be locked against longitudinal movement, the upper and lower rails 262 and 264 on the rearward section 214 of the frame include a lengthwise series of locking holes 326. The post member correspondingly includes an upper and lower pin 328 and 330 for insertion into a selected pair of these locking holes. The lower pin 330 is fixedly mounted on the tail piece 316, but the upper pin 328 is fully retractable from its forward locking position using a pin-retracting mechanism 332. Such retraction permits movement of the upper portion 318 to its uppermost position in order to unlatch the upper hook portion 324 so as to allow repositioning of the post member. Alternatively, the pin-retracting mechanism holds the upper pin 328 in its forward locking position under the bias of a coiled spring 334 and thereby serves to retain the upper hook portion in its latched position. In accordance with these operations, the pin-retracting mechanism 332 can also aptly be termed a quick-locking or -unlocking mechanism.

The component parts of the pin-retracting mechanism 332 include an open-sided housing 336 which is mounted on the upper portion 318, an upper pin 328 which is inserted through aligned holes in the housing and the upper portion, and a coiled spring 334. This spring bears, on one side, against an inner surface of the housing and, on the other side, against a cross pin 340 projecting laterally from an intermediate section of the upper pin. These elements act in cooperation to biasably hold the upper pin in its locking position. The pin-retracting mechanism further includes a lever 342 attached to the rearward end of the upper pin and a slot 344 in the housing. This enables the pin to be drawn back using the lever to its fully retracted unlocked position and then to be rotated to bring the cross pin 340 into the slot so that the pin will selectively retain this position.

Referring to FIG. 10, as noted above, the second frame embodiment 200 includes a door-protecting mechanism 224 that is composed of both a length-adjusting mechanism 206 and a bumper mechanism 226. FIG. 11 shows how the rearward section 214 of the second frame embodiment 200 looks just after it has been loaded, in accordance with a preferred method, for transit inside a transport enclosure 346. This transport enclosure is of the standard type having a floor 348, a ceiling 350, and an opposite pair of elongate side walls 352 and end walls 354 (one of each shown). The rearward end wall 354 defines an entryway 356 and includes a door 358 to close the entryway.

As indicated in FIG. 11, on each side of the frame, the bumper mechanism 226 includes an upper bumper assembly 360 and a lower bumper assembly 362. As further shown in FIG. 11, both the upper portion of the length-adjusting mechanism 206 (including lengthwise rails 256 and 262) and the lower portion of the length-adjusting mechanism (including lengthwise rails 258 and 264) extend in directions opposite the door, as do also the upper and lower bumper assemblies 360 and 362 of the bumper mechanism. This enables, in turn, a form of frame construction which is better able to withstand the shock forces which are generated during internal collisions between the frame and its transport enclosure. In other words, since the component parts of the door-protecting mechanism extend in a direction opposite the closed door, this means that from the standpoint of the frame, there will be no need to resolve any shock forces which are off to one side of its primary load-bearing structures. This also means, of course, that from the standpoint of the container, all shock forces generated will be conveyed to the door instead of to sturdier structures, such as the overhanging portion of the end wall 354 above the door. However, as further explained below, the combined force-reducing effects of the length-adjusting mechanism and the bumper mechanism reduce the shock forces sufficiently that direct absorption of impact by the door is not a problem.

Figure 14:
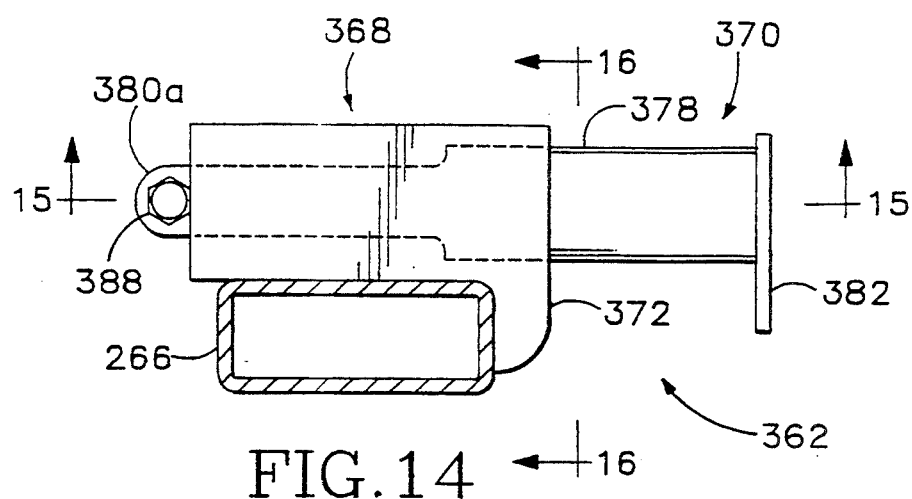
FIG. 14 is a plan view taken-along lines 14—14 in FIG. 11 showing a respective bumper mechanism on the end of the frame.

FIG. 14 illustrates how one of the lower bumper assemblies 362 is mounted on the corresponding rearwardmost brace member 266. Each of the other bumper assemblies (including the other lower assembly 362 and the two upper assemblies 360) are similarly mounted on a rearwardmost brace member, that is, each bumper assembly is approximately aligned transversely with the sides of the frame. Furthermore, as indicated in FIG. 11, each upper bumper assembly 360 is approximately aligned vertically with the respective length-extending rails 256 and 262. Stating these relationships another way, the upper bumper assemblies 360 are each in approximate end-to-end alignment with the primary lengthwise upper structures of the frame. This ensures that any force transmitted to these lengthwise upper structures (e.g., to the rails 256 and 262) by the upper bumper assemblies will be received along the strongest (thickest) structural axis of these structures. In other words, in accordance with this particular arrangement of the upper bumper assemblies, the lengthwise upper structures of the frame are subjected only to columnar loading and not to any off-axis loading that would tend to bend or buckle these structures along a weaker structural axis.

With respect to the lengthwise lower structures of the frame, each lower bumper assembly 362 can develop a reaction force which, acting through the corresponding brace member 266, can establish a bending moment relative to the corresponding lower rails 258 and 264. However, this bending moment is partially resolved at each lower wheel assembly 204. Also, the solid construction of the rearwardmost lower rail 264 prevents significant buckling or bending of that rail. (The lower bumper assemblies 362 are mounted in this slightly off-axis arrangement to permit the passage of sleds or other external vehicle-loading mechanisms into the frame.) It will further be recognized that the described arrangement of four individual bumper assemblies 360 and 362 (two each of the upper and lower) more widely distributes the total shock force which is generated and therefore provides better shock protection than would a single or even a pair of bumper assemblies.

Figures 15, 16:
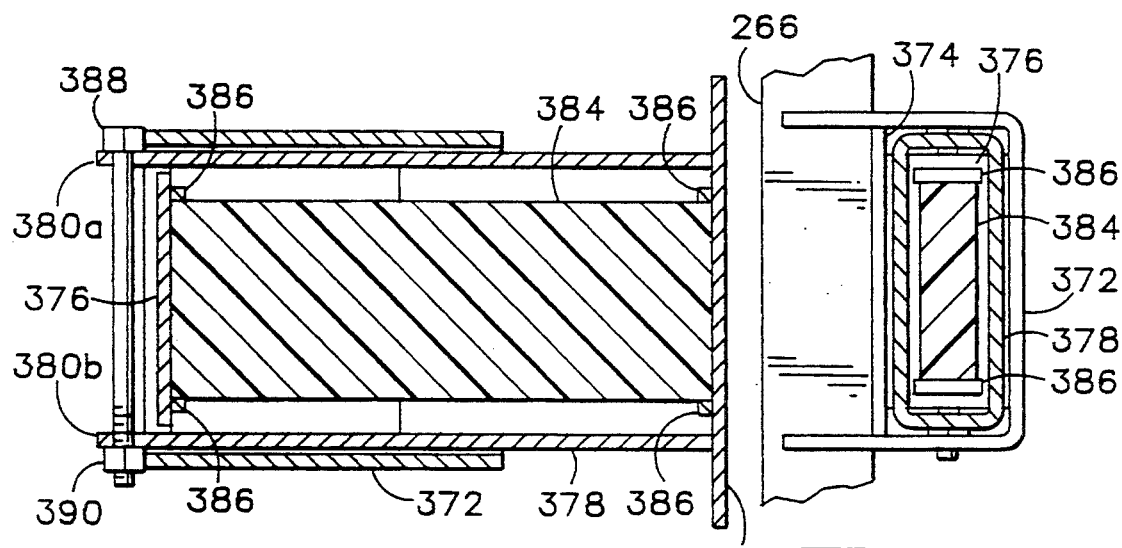
FIG. 15 is a sectional view taken along lines 15—15 in FIG. 14 showing interior details of the construction of the bumper mechanism.
FIG. 16 is a partially sectional view taken along lines 16—16 in FIG. 14 showing further construction details of the bumper mechanism.

FIGS. 14–16 show details of the construction of one of the lower bumper assemblies 362. Each of the other upper and lower bumper assemblies is of substantially equivalent construction. The bumper assembly 362 includes a base portion 368 and a head portion 370 movable within the base portion. The base portion includes a U-shaped outer member 372 which has portions of its sides cut away in order to mount conformably along the inside and rearward surfaces of the brace member 266. Mounted inside the outer member is an interior side plate 374 and mounted across the end of the interior side plate is a back plate 376 (FIGS. 15–16). The outer member, interior side plate and back plate together form a rectangular chamber which is open at one end and which, at the other end, has narrow upper and lower openings. These openings are formed because the height of the back plate 376 is less than the interior height of the outside member 372 (refer to FIGS. 15–16).

The head portion 370 of the bumper assembly 143 includes a rectangular tube 378, the sides of which have been cut away, beginning midway along the tube, in order to form upper and lower arms 380a and 380b. These arms are thus suitably constructed for movement through the upper and lower openings formed along the back plate 376. Mounted on the rearward end of the rectangular tube is an end plate 382.

Referring now to FIG. 15, a block of elastomeric material 384 is fitted between the back plate 376 of the base portion 378 and the end plate 382 of the movable head portion 370. To help support the block, the back plate and the end plate each include a pair of parallel shoulders 386. Each pair of shoulders snugly receives a respective end of the block (refer to FIG. 16). To keep the head portion 370 from slipping out of the base portion 368, opposite holes are formed in the upper and lower arms 380a and 380b of the rectangular tube so that a catch bolt 388 can be run between these arms. This catch bolt, together with its associated nut 390, traps the upper and lower arms so that these arms cannot be moved back through the openings formed above and below the back plate 376. In the bumper assembly depicted in FIGS. 15–16, the block of elastomeric material 384 is made of polyurethane rubber of 80 Durometer hardness. Such material is commercially available for purchase and is sold, for example, by Griffith Polymers, Inc. based in Hillsboro, Oreg. Aside from the elastomeric block, the remaining elements of the bumper assembly are made of steel and are joined together, in accordance with the manner of connection just described, by welding.

FIG. 11 shows the rearward section 214 of the second frame embodiment 200 just after the frame has been loaded into a transport enclosure 346 in accordance with a preferred method of loading. In particular, FIG. 11 shows the position of the rearward section 214 relative to the door 358 of the enclosure after the forward end 208 (FIG. 19) of the frame has been moved into contact with the forward end wall (not shown) of the enclosure and just after the door of the enclosure has been shut. In accordance with the preferred method of loading the frame, the rearward end 210 of the frame does not come into contact with the door as the door is being closed but rather the upper and lower bumper assemblies 360 and 362 are spaced slightly apart from the door to permit the door to be closed free of any opposition by these bumper assemblies. Desirably, the dimensions of the frame are selected to ensure that this procedure is possible, with appropriate allowances made for possible deviation of actual container length from its rated length. This procedure is of particular significance when the transport enclosure 346 is fully loaded for return transport with six empty frames, since the combined opposition of their associated bumper assemblies could make closure of the door quite difficult.

Referring to FIG. 23, an alternative approach to mounting of the bumper assemblies is to incorporate the upper and lower bumpers 360 and 362 directly on the rearward end 210 of the frame. In accordance with this design, a respective tubular socket 442 or 444 is mounted on each end of each rearwardmost brace member 266 in horizontal forward extension from that member. Each tubular socket supports either an upper or lower rail 262 or 264 so as to enable telescoping movement of that rail relative to the corresponding socket, and hence the corresponding rearwardmost brace member. An elastomeric block of material 446 or 448 is inserted into the rearward end of each socket and each rearward end is closed off by a capping plate 450 or 452 so that each upper and lower rail movably presses against the corresponding shock-absorbing block upon impact between the frame's rearward end 210 and the door. This preferred approach affords an even wider distribution of force than the use of four discrete bumpers, since the entire end of the frame impacts the door, and also allows the shock-absorbing blocks to be positioned in-line with both the upper and lower rails. A quarter-inch thick strip of neoprene 453 having a pressure-sensitive adhesive backing is preferably mounted along the rearward end 210 of the frame as shown.

To prevent each upper and lower rail 262 and 264 from forwardly sliding clear of its socket 442 or 444, a pin 454 extends across the inside of each socket and passes through a slot 456 or 458 formed adjacent the rearward end of each upper and lower rail. Each elastomeric block of material 446 and 448 is preferably in a slightly precompressed state prior to impact so that the corresponding upper or lower rail 262 or 264 maintains a stable position within the corresponding socket until impact. For ease in handling, the rearward or socket-traveling portion 460 and 462 of each upper and lower rail 262 and 264, respectively, is desirably shaped while it is still separate from the longer-length forward portion of the corresponding rail, to which longer-length forward portion it is then attached, as by a butt weld 464 or 466.

It will noted that at the time of loading, irrespective of the bumper design used, no adjustment of the bumper assemblies 360 and 362 is necessary. Instead, these assemblies are automatically fully operative for protection of the enclosure door. Nor is it necessary that the frame be limited to any fixed axis of movement relative to the door. Indeed, the frame can even shift to an axis that is at a slight diagonal to the door without affecting the performance of its bumper assemblies.

With the frame 200 loaded inside the transport enclosure 346, a sudden shift in the rate of movement of the enclosure can cause collision between the frame and the enclosure because the wheels 204 of the frame enable movement of the frame relative to the enclosure and because the tendency of the frame will be to remain relatively motionless until the frame is forced into movement by such collision. For example, from a stopped position, sudden acceleration of the enclosure can cause direct impact between the upper and lower pairs of bumper assemblies 360 and 362 on the frame and the door 358 of the enclosure. It will be noted that as a result of this impact there must be a sufficient change in the momentum of the frame for the velocity of the frame to increase to the velocity of the enclosure.

Without the upper and lower bumper assemblies 360 and 362 in place, the period of impact, defined as that period of time over which shock forces are generated, would be very short because little deformation of the solid structures of the frame is needed to produce large forces, and these large forces would require little time to bring the velocity of the frame up to the velocity of the enclosure. In other words, without the shock absorbers in place, large shock forces would be generated over a period of impact that is relatively short. It is the peak level of these large shock forces which are of concern because if this peak level exceeds a certain value, this can cause the frame to damage and even break the door.

The length-adjusting mechanism 206 on the frame permits expansion of the frame to more fully occupy the lengthwise space inside the enclosure. This means that the enclosure will have less time to build up to a velocity that is substantially different than the preimpact velocity of the frame, so that less force will be needed during impact in order for the frame velocity to catch up with the enclosure velocity. However, if the length-adjusting mechanism is acting alone without the upper and lower bumper assemblies 360 and 362 in place, the period of impact will still be moderately short and the peak level of the shock forces generated will still be moderately large.

Figure 17:
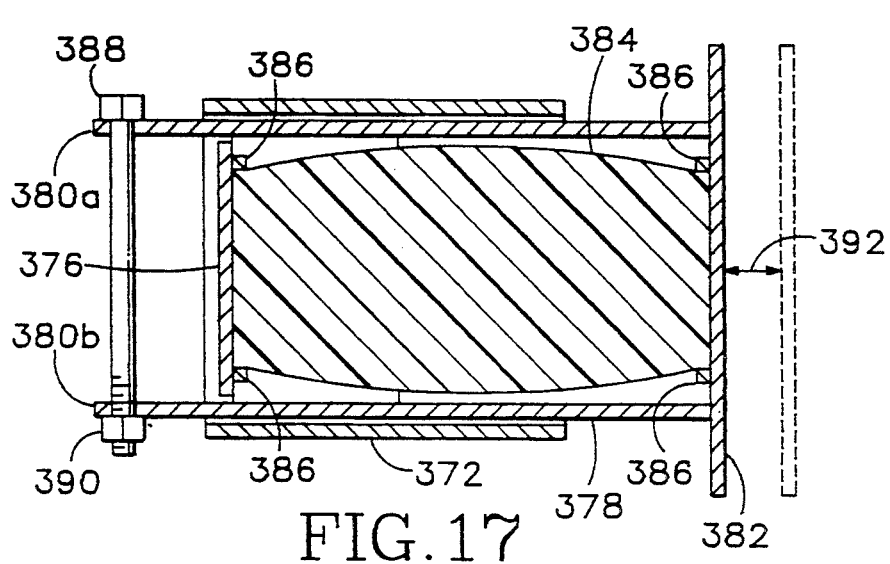
FIG. 17 is a sectional view corresponding to the view of FIG. 15 but showing the condition of the bumper mechanism during impact of the bumper mechanism with the transport container.
Figure 19:
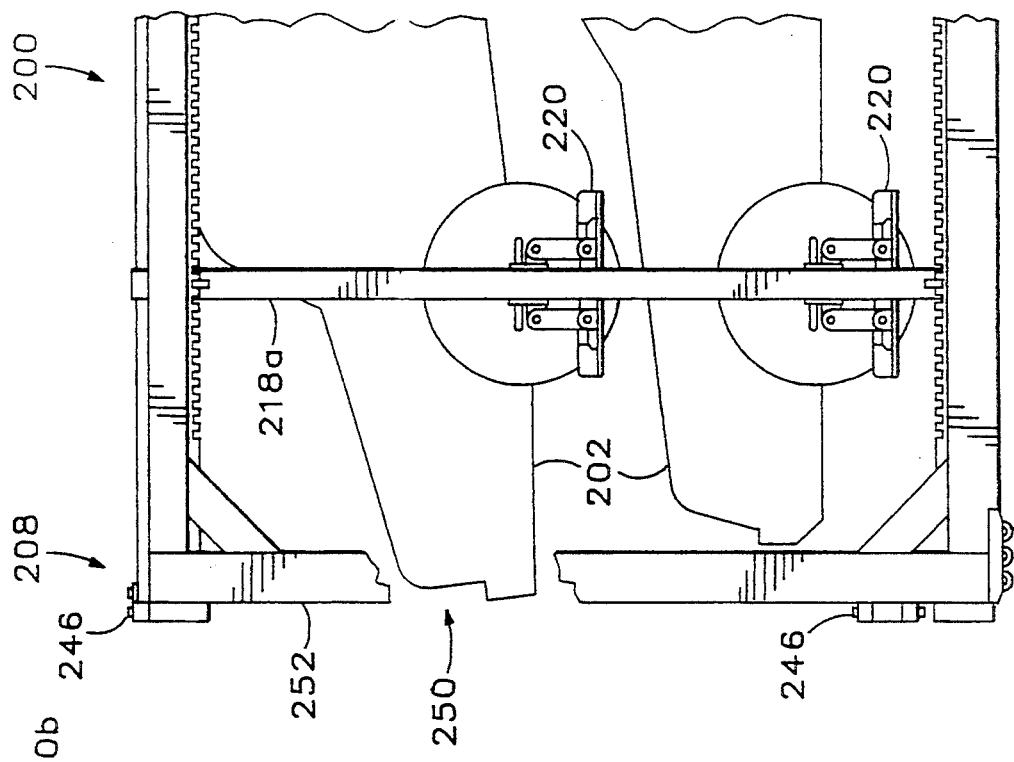
FIG. 19 is an enlarged and partially broken-away side elevational view of the forward end of the frame of FIG. 10.

Referring now to FIG. 17, with the upper and lower bumper assemblies 360 and 362 in place, the period of impact will be relatively long because a relatively large deformation 392 of each bumper assembly must occur to produce even moderate forces, and these moderate forces will need to act for a relatively long period of time in order to bring the velocity of the frame up to the velocity of the enclosure. In other words, with the upper and lower bumper assemblies 360 and 362 in place, only relatively modest shock forces will be generated and the period of impact will be relatively long. It is improbable that the peak level of these modest shock forces will rise to a level sufficient to damage the enclosure door.

Because the upper and lower bumper assemblies 360 and 362 enable the rate of movement of the frame to change relatively gradually in order to catch up with the rate of movement of the enclosure, the bumper assemblies 360 and 362 serve to protect not only the enclosure door and frame, but also the vehicles 202 loaded on the frame. That is, the bumper assemblies protect these vehicles against sudden jolts.

While, in accordance with the present invention, a preferred embodiment of the adjustable frame 20 has been described, it will be recognized that certain modifications of the frame are possible without departing from the broader principles of the present invention. For example, whether the plurality of longitudinally-spaced locking holes are formed in the respective arms of the insert as shown, or whether they are formed, instead, in the respective rail sections, makes little difference in terms of being able to provide a plurality of forward and rearward locking positions. Clearly, also, the respective arm-supporting members and the respective arms of the insert can be constructed and connected together in a variety of ways, and it is even possible, with some loss in functionality, to dispense entirely with particular elements of the exemplary insert, such as the brace member or the wheels. Also, if desired, the brace member 44, and/or inward brace members 26 which are closest to the brace member 44, could be constructed similarly to the post members 32 so as to be capable of mounting hangers 34 if needed for certain applications, even though they are not movable longitudinally along the rails as are the post members 32.

Similarly, it will be recognized that modifications of the second frame embodiment 200 are possible without departing from the broader principles of the invention. For example, the friction-reducing mechanism may be composed of a series of discrete elements spaced longitudinally from each other or may be integral with one or the other rail. Various length-adjusting mechanisms can be used to enable lengthwise shifting adjustment of the frame sections without necessarily having, for example, one rail telescopically movable inside the other. Furthermore, various forms of shock-absorbing bumpers may be used, such as an end-mounted shock absorber of the type described in the Background section. These various alternatives, however, may or may not serve to improve on the results achieved with the second frame embodiment. For example, the preferred bumper assemblies which are above-described have the advantage of being fluidless and are relatively inexpensive to manufacture in comparison to the type of shock absorbers described in the Background section.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An elongate vehicle-supporting frame comprising:
    (a) a pair of transversely spaced elongate upright sides capable of supporting a vehicle transversely between said sides, said pair of sides defining a forward end and a rearward end longitudinally separated from each other;
    (b) a movement mechanism underlying said sides enabling movement of said frame while said frame is in transit inside a transport enclosure: and
    (c) a door-protecting mechanism on said frame arranged so as to be aligned opposite the door of said transport enclosure while said frame is inside said transport enclosure, said door-protecting mechanism including a shock-absorbing mechanism to reduce the peak level of any shock force generated between said frame and said door in response to an abrupt shift in the rate of movement of said transport enclosure.

2. The frame of claim 1 wherein each side includes respective upper and lower elongate structural members, each structural member extending longitudinal of said frame between said forward and rearward ends, said door-protecting mechanism being mounted in approximate end-to-end alignment with at least one of said upper and lower elongate structural members.

3. The frame of claim 1 wherein said door-protecting mechanism further includes a length-adjusting mechanism on each side enabling lengthwise adjustment of the position of said forward end relative to said rearward end in order for said frame to more fully occupy the empty space inside said transport enclosure.

4. The frame of claim 1 further including a width-adjusting mechanism connected transversely between said sides enabling movement of said sides between an open position, in which said sides are transversely spaced apart sufficiently to support said vehicle therebetween, and a collapsed position, in which said sides are closely adjacent transversely to each other.

5. The frame of claim 1 wherein said door-protecting mechanism is configured so as to enable said door to be closed free of opposition by said door-protecting mechanism.

6. The frame of claim 1 wherein said shock-absorbing mechanism is fluidless.

7. The frame of claim 1 wherein said frame along said rearward end includes a transversely extending, generally rectangular end frame including horizontal and vertical members, and said door-protecting mechanism is configured so that said shock force is resolved by said door over an area of said door substantially coextensive with said horizontal and vertical members.

8. The frame of claim 1 wherein said frame along said rearward end includes a transversely extending, generally rectangular end frame including horizontal and vertical members, and said door-protecting mechanism is configured so that said end frame is longitudinally movable with respect to said forward end in automatic response to said shock force.

9. The frame of claim 1 further including an elongate wheel cradle made of aluminum and connectable between said sides so as to extend transversely therebetween for supporting one of the transverse pairs of wheels of said vehicle.

10. The frame of claim 3 including respective forward and rearward wheel-supporting assemblies for supporting the forward and rearward pairs of wheels of said vehicle, respectively, at least one of said wheel-supporting assemblies being movable longitudinally independently of the other wheel-supporting assembly between a plurality of longitudinally spaced wheel-supporting positions, said wheel-supporting positions including a central position located approximately midway between said forward and rearward end.

11. The frame of claim 3 further including a friction-reducing mechanism associated with each length-adjusting mechanism and configured so as to reduce the level of frictional resistance opposing said lengthwise adjustment.

12. The frame of claim 11 wherein said friction-reducing mechanism includes an elongate smooth-faced member.

13. A method for transporting an elongate vehicle-supporting frame comprising:
 (a) providing an elongate transport enclosure having a floor, a ceiling, a pair of elongate side walls and respective first and second end walls, said first end wall defining an entryway and including a door to close said entryway;
 (b) providing an elongate frame suitably dimensioned to be received within said transport enclosure by insertion through said entryway, said frame including a pair of transversely spaced elongate upright sides capable of supporting a vehicle transversely between said sides, said pair of sides defining a forward end and a rearward end longitudinally separated from each other; and
 (c) protecting said door from becoming damaged due to collision between said frame and said door while said frame is in transit inside said transport enclosure including providing a door-protecting mechanism on said frame and closing said door while said door-protecting mechanism extends in a direction opposite to said door.

14. The method of claim 13 wherein step (c) includes closing said door free of opposition by said door-protecting mechanism.

15. An elongate vehicle-supporting frame comprising:
 (a) a pair of transversely spaced elongate upright sides capable of supporting a vehicle between said sides, each respective side defining a forward end and a rearward end longitudinally separated from each other;
 (b) a length-adjusting mechanism on each respective side between said forward end and said rearward end enabling lengthwise shifting adjustment of the position of said forward end relative to said rearward end in order to vary the separation therebetween and thereby vary the length of each respective side; and
 (c) a friction-reducing mechanism associated with each length-adjusting mechanism and configured so as to reduce the level of frictional resistance opposing said lengthwise shifting adjustment.

16. The frame of claim 15 wherein each side is divided into a pair of sections including a forward section along said forward end and a rearward section along said rearward end, said length-adjusting mechanism including a respective lengthwise-extending member on each section, said members being coupled together shiftably in longitudinally overlapping relationship to each other.

17. The frame of claim 15 including respective forward and rearward wheel-supporting assemblies for supporting the forward and rearward pair of wheels of said vehicle, respectively, at least one of said wheel-supporting assemblies being movable longitudinally independently of the other wheel-supporting assembly between a plurality of longitudinally spaced wheel-supporting positions, said wheel-supporting positions including a central position located approximately midway between said forward and rearward ends.

18. The frame of claim 15 wherein said length-adjusting mechanism enables slidable adjustment of the position of said forward end relative to said rearward end.

19. The frame of claim 15 wherein each side is divided into a plurality of sections, said length-adjusting mechanism including a respective lengthwise-extending member on each of at least a pair of said sections, said friction-reducing mechanism being attached alongside one of said lengthwise-extending members.

20. The frame of claim 15 wherein said friction-reducing mechanism includes a smooth-faced member.

21. The frame of claim 20 wherein said smooth-faced member is made of plastic.

22. An elongate vehicle-supporting frame comprising:
 (a) a pair of transversely spaced elongate upright sides capable of supporting a vehicle between said sides, each respective side defining a forward end and a rearward end longitudinally separated from each other;
 (b) a length-adjusting mechanism on each respective side between said forward end and said rearward end enabling lengthwise shifting adjustment of the position of said forward end relative to said rearward end in order to vary the separation therebetween and thereby vary the length of each respective side; and
 (c) respective forward and rearward wheel-supporting assemblies for supporting the forward and rearward pair of wheels of said vehicle, respectively, at least one of said wheel-supporting assemblies being movable longitudinally independently of the other wheel-supporting assembly between a plurality of longitudinally spaced wheel-supporting positions, said wheel-supporting positions including a central position located approximately midway between said forward and rearward ends.

23. An elongate vehicle-supporting frame comprising:
 (a) a pair of transversely spaced elongate upright sides capable of supporting a vehicle transversely between said sides, said pair of sides defining a forward end and a rearward end longitudinally separated from each other;
 (b) an end assembly transversely connected across said sides adjacent said forward end for transverse support of said sides; and
 (c) a plurality of brace members reinforcing said end assembly, said brace members being relatively arranged such that an open space is centrally defined between said brace members of sufficient size to receive the end of a vehicle.

* * * * *

UNITED STATES PATENT AND TRADEMARK OFFICE
CERTIFICATE OF CORRECTION

PATENT NO. : 5,445,278

DATED : August 29, 1995

INVENTOR(S) : Peter Gearin et al.

It is certified that error appears in the above-indentified patent and that said Letters Patent is hereby corrected as shown below:

Col.  2, line 36    Change ".each" to --each--

Col. 10, line 28    Change "and-not" to --and not--

Col. 13, line 16    Change "member." to --member--

Col. 14, line 52    Change "of-the" to --of the--

Col. 19, line  6    Change "frame-in" to --frame in--

Col. 20, line 36    Change ".from" to --from--

Signed and Sealed this

Twenty-fourth Day of December, 1996

Attest:

BRUCE LEHMAN

*Attesting Officer*     *Commissioner of Patents and Trademarks*